United States Patent
Shimonishi

[11] Patent Number: 5,862,905
[45] Date of Patent: Jan. 26, 1999

[54] TRANSPORT APPARATUS

[75] Inventor: Iwao Shimonishi, Ikoma, Japan

[73] Assignee: Shimonishi Seisakusyo Co., Ltd., Higashiosaka, Japan

[21] Appl. No.: 712,379

[22] Filed: Sep. 11, 1996

[30] Foreign Application Priority Data

| | | | |
|---|---|---|---|
| Sep. 13, 1995 | [JP] | Japan | 7-262413 |
| Jun. 11, 1996 | [JP] | Japan | 8-172893 |
| Jun. 11, 1996 | [JP] | Japan | 8-172894 |

[51] Int. Cl.$^6$ ............................................. B65G 35/00
[52] U.S. Cl. ............................... 118/619; 198/690.1
[58] Field of Search ............................ 198/396, 619, 198/690.1, 778

[56] References Cited

U.S. PATENT DOCUMENTS

| | | | |
|---|---|---|---|
| 3,759,367 | 9/1973 | Elliott | 198/619 |
| 3,952,857 | 4/1976 | Nazuka | 198/619 X |
| 4,818,378 | 4/1989 | Elliott | 198/690.1 X |

FOREIGN PATENT DOCUMENTS

| | | | |
|---|---|---|---|
| 1054013 | 3/1959 | Germany | 198/690.1 |
| 1719287 | 3/1992 | U.S.S.R. | 198/690.1 |

*Primary Examiner*—James R. Bidwell
*Attorney, Agent, or Firm*—Armstrong, Westerman, Hattori, McLeland & Naughton

[57] ABSTRACT

A transport apparatus includes a transport member having a cylindrical configuration. A supporting guide consisting of a wire circular in section is spirally wound on the peripheral surface of the transport member. A cylindrical rotary member is rotatably accommodated inside the transport member. A magnetic force generation portion is linearly provided on the peripheral surface of the rotary member along the axial direction of the rotary member. The rotary member is driven by a rotation means such as a motor to transport an object of transporting such as parts from a lower side of the transport member toward an upper side of the transport member in the axial direction of the transport member along the lead angle direction of the supporting guide, with the parts being magnetically attracted to the peripheral surface of the transport member.

23 Claims, 31 Drawing Sheets

FIG.7(A)
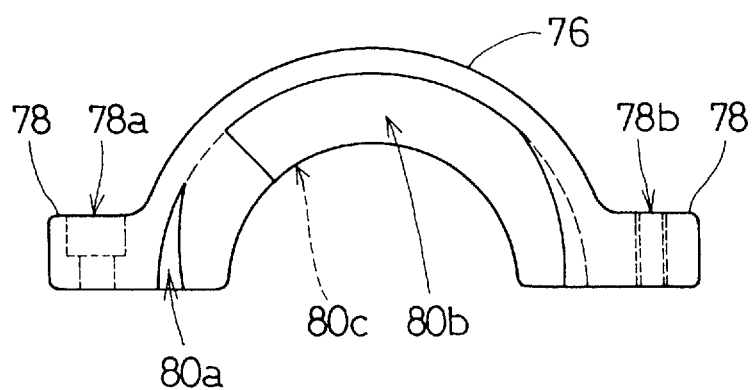
FIG.7(B)
FIG.7(C)
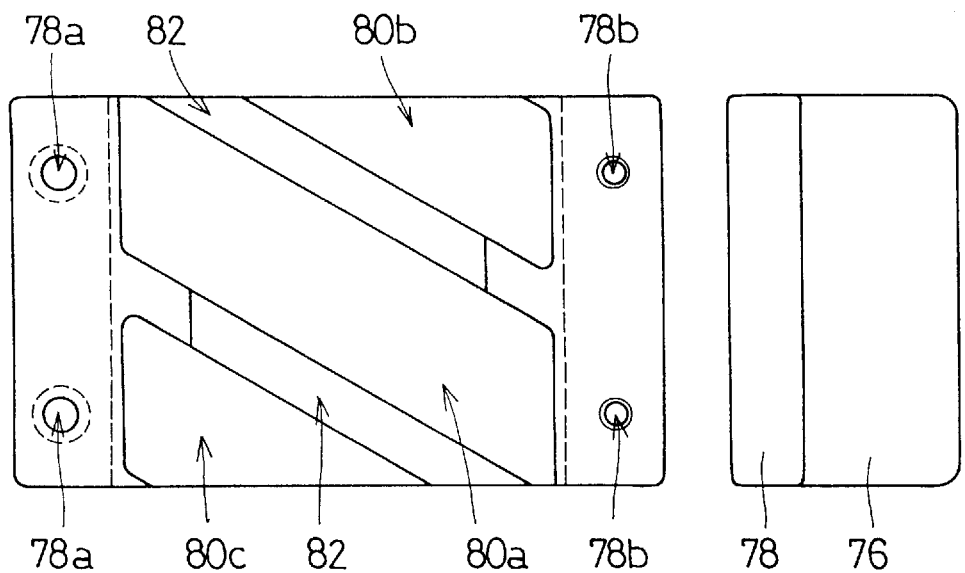

FIG.19(A)  FIG.19(B)  FIG.19(C)
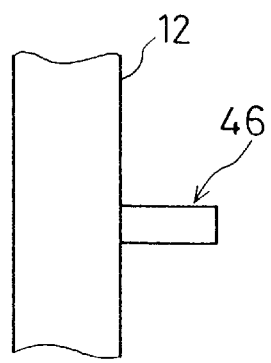 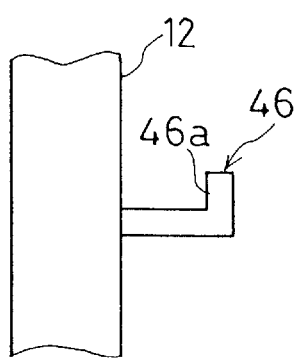 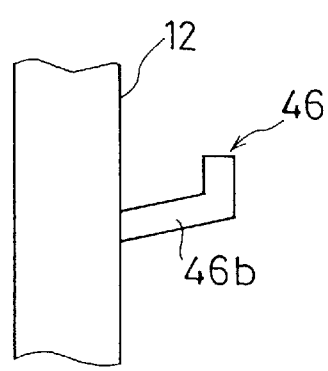
FIG.20(A)  FIG.20(B)  FIG.20(C)
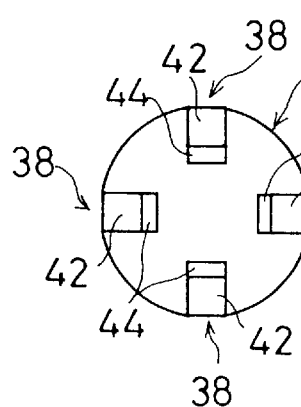 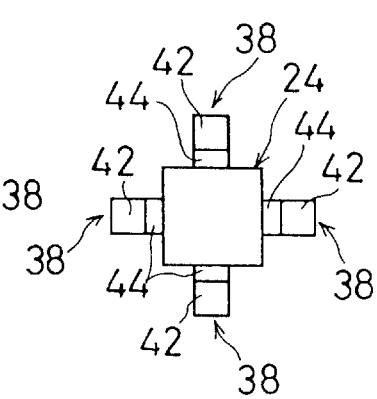 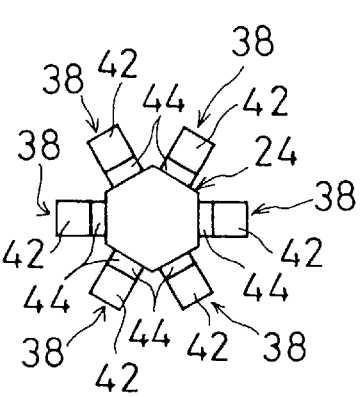

TRANSPORT APPARATUS

BACKGROUND OF THE INVENTION

1. Field of the Invention

The present invention relates to a transport apparatus in general and more particularly to a transport apparatus for transporting an object of the transporting, for example, parts made of magnetic materials such as steel balls, machine screws, bolts, nuts or the like to desired directions.

2. Description of the Prior Art

As a transport apparatus for transporting parts upward, a bucket elevator is known. In the bucket elevator, buckets installed at regular intervals on an endless annular chain or belt are traveled upward to transport parts contained in the buckets sequentially to desired places.

FIG. 32(A) is a schematic view showing an example of a conventional transport apparatus which forms the background of the present invention. The transport apparatus 1 comprises a belt conveyor 2 provided with a magnet roller 2a. A magnet portion 4 consisting of a magnet plate or a magnet bar is provided on the underside of a belt 3. In the transport apparatus 1, parts W are magnetically attracted to the upper surface of the belt 3 by the magnetizing force of the magnet portion 4 so as to transport them obliquely upwardly.

FIG. 32(B) is a schematic view showing another example of a conventional transport apparatus which forms the background of the present invention. A transport apparatus 1 comprises a bottomed cylindrical transport member 5. A rotary shaft 6 is rotatably provided inside the transport member 5. The rotary shaft 6 is rotatably supported by the transport member 5 through a bearing 7. A groove 8 is spirally formed on the peripheral surface of the rotary shaft 6. A plurality of magnets 9 is formed inside the groove 8. In the transport apparatus 1, the rotary shaft 6 is rotated to transport the parts W (such as, iron powders) obliquely upwardly, with the parts W being magnetically attracted to the peripheral surface of the transport member 5.

In the above-described transport apparatuses, normally, the parts W are taken out from the elevator or the conveyor to transport them to desired places.

In the transport apparatus comprising the bucket elevator, however, it takes much time and labor to manufacture the buckets. Further, the elevator is large, and thus the installing space of the entire apparatus is large. Thus, the running cost is high.

In the transport apparatus 1 shown in FIG. 32(A), the installing space of the conveyor is large and further, it is difficult to upwardly vertically transport parts such as steel balls which contact the upper surface of the belt 3 in a small area. This is because the parts W are transported along the belt 3, with the parts W being supported on the upper surface of the belt 3 by only the magnetic attraction force of the magnet portion 4.

In the transport apparatus 1 shown in FIG. 32(B), the parts W such as iron powders can be reliably transported obliquely upwardly. But it is difficult to transport comparatively large parts such as steel balls, machine screws, bolts, nuts, coil springs or the like vertically upwardly.

In the transport apparatus 1 shown in FIGS. 32(A) and 32(B), in transporting the parts W such as hexagon nuts, hexagon head bolts or the like and pillar-shaped parts such as triangular prisms having a comparatively great contact area, surfaces of the magnetized parts W are attracted to each other in undesired postures. That is, bridging of the parts W occurs. Thus, it is difficult to transport the parts W smoothly along a transport path.

Further, in each of the above-described transport apparatuses, the parts W are taken out from the transport path of the elevator or that of the conveyor at a fixed take-out position thereof in transferring the parts W to desired places from each of the transport apparatuses. Thus, it is difficult to alter the take-out position easily.

SUMMARY OF THE INVENTION

It is accordingly a first object of the present invention to provide a transport apparatus having a simple construction and capable of transporting an object of transporting such as parts in any desired directions.

It is a second object of the present invention to provide a transport apparatus having a minimized space and capable of transporting an object of transporting such as parts easily and successively in a vertical direction.

It is a third object of the present invention to provide a transport apparatus having a simple construction and a minimized space and capable of transporting an object of transporting such as parts smoothly without the parts being bridged with each other.

It is a fourth object of the present invention to provide a transport apparatus having a simple construction and capable of transporting an object of transporting such as parts successively to desired directions and transferring them to required places in desired directions by taking out the object of transporting such as parts at a desired position of a transport path of the transport apparatus.

A transport apparatus described in claim 1 comprises a cylindrical transport member; a cylindrical rotary member positioned inside the transport member; a magnetic force generation portion provided on the rotary member in an axial direction the rotary member of and generating a magnetic field over a peripheral surface of the transport member; and a supporting guide formed on the peripheral surface of the transport member. In this construction, the rotation of the rotary member allows an object of transporting such as parts to be transported in an axial direction of the transport member along the supporting guide, with the an object of transporting being magnetically attracted to the peripheral surface of the transport member.

In a transport apparatus described in claim 2, the supporting guide extends spirally from one side of the transport member to the other side of the transport member in the axial direction of the transport member.

In a transport apparatus described in claim 3, a plurality of magnet strips is arranged on the rotary member in a line along the axial direction of the rotary member.

A transport apparatus described in claim 4 comprises a cylindrical transport member; a cylindrical rotary member accommodated inside the transport member; a groove formed on a peripheral surface of the rotary member in a line along an axial direction of the rotary member; one or more magnet strips mounted on the rotary member in a line along the axial direction of the rotary member and generating a magnetic field over a peripheral surface of the transport member; and a supporting guide spirally formed on the peripheral surface of the transport member, and a rotation means for rotating the rotary member. In this construction, the rotation of the rotary member allows an object of transporting to be transported in an axial direction of the transport member along the supporting guide, with the the object for transporting being magnetically attracted to the peripheral surface of the transport member.

A transport apparatus described in claim 5 further comprises a yoke strip mounted on a surface of the magnet strip or strips and concentrating magnetic lines of force emitted by the magnet strip or strips.

A transport apparatus described in claim 6 further comprises a transfer means extending outward from the peripheral surface of the transport member and transferring the object of transporting being transported in the axial direction of the transport member to a place at a certain distance apart from the transport member.

In a transport apparatus described in claim 7, the transport member stands vertically so that the object of transporting are transported from one side of the transport member to the other side of the transport member in the axial direction of the transport member along the supporting guide.

In a transport apparatus described in claim 8, the supporting guide includes a plurality of supporting strips.

A transport apparatus described in claim 9 comprises a cylindrical transport member; a guide container storing an object of transporting in the guide container temporarily and supplying the object of transporting to the transport member; a cylindrical rotary member accommodated inside the transport member; a magnetic force generation portion provided on the rotary member and generating a magnetic field over a peripheral surface of the transport member; a supporting guide spirally formed on the peripheral surface of the transport member, and a prevention means for preventing the object of transporting transported from the guide container to the transport member from being bridged with each other. In this construction, the rotation of the rotary member allows the object of transporting supplied from the guide container to be transported in an axial direction of the transport member along the supporting guide, with the object of transporting being magnetically attracted to the peripheral surface of the transport member.

In a transport apparatus described in claim 10, the prevention means includes a transfer means for transferring the object of transporting along a progress direction of the supporting guide.

In a transport apparatus described in claim 11, the transfer means includes a stirring means for stirring the object of transporting around the transport member.

In a transport apparatus described in claim 12, the transfer means includes a shake means for shaking the object of transporting.

In a transport apparatus described in claim 13, the stirring means includes a rotation means for rotating the guide container on the transport member.

A transport apparatus described in claim 14 comprises a cylindrical transport member; a guide container mounted on the transport member at one side of the transport member in an axial direction of the transport member and storing an object of transporting in the guide container temporarily and supplying the object of transporting to the transport member; a cylindrical rotary member accommodated inside the transport member; a magnet provided on the rotary member linearly in an axial direction of the rotary member and generating a magnetic field over a peripheral surface of the transport member; a supporting guide spirally formed on the peripheral surface of the transport member, and a rotation means for rotating the guide container in the same direction as a rotation direction of the rotary member for transporting the object of transporting around the transport member along the supporting guide. In this construction, the rotation of the rotary member allows the object of transporting supplied from the guide container to be transported from one side of the transport member to the other side of the transport member in an axial direction of the transport member along the supporting guide, with the parts being magnetically attracted to the peripheral surface of the transport member.

In a transport apparatus described in claim 15, the transport member stands vertically so that the object of transporting are transported from one side of the transport member to the other side of the transport member in the axial direction of the transport member along the supporting guide.

A transport apparatus described in claim 16 comprises a transport means for transporting an object of transporting along a transport path extending from one side of the transport apparatus to the other side of the transport apparatus; a transfer path for transferring the object of transporting transported along the transport path of the transport means to a place at a certain distance apart from the transport member; and a supporting means for supporting the transfer path at a predetermined position of the transport path. In this construction, the supporting means has a pair of sandwiching members for sandwiching the transport path and a clamping means for clamping the sandwiching members to the transport path; and a pair of the sandwiching members is mounted on the transport path such that the sandwiching members are movable in a transport direction of the transport path and rotatable in a circumferential direction of the transport path.

A transport apparatus described in claim 17 comprises a cylindrical transport member; a cylindrical rotary member accommodated inside the transport member; a magnetic force generation portion formed on the rotary member and generating a magnetic field over a peripheral surface of the transport member; a supporting guide spirally formed on the peripheral surface of the transport member; a transfer path for transferring an object of transporting transported along the supporting guide to a place at a certain distance apart from the transport member; and a supporting means for supporting the transfer path at a predetermined position of the transport member. In this construction, the rotary member rotates such that the object of transporting are transported in a lead angle direction of the supporting guide, thus causing the object of transporting to be magnetically attracted to the peripheral surface of the transport member, with the result that the object of transporting are transported in an axial direction of the transport member along the supporting guide. In this construction, the supporting means has a pair of sandwiching members for sandwiching the transport member and a clamping means for clamping a pair of the sandwiching members to the transport member; and a pair of the sandwiching members is mounted on the transport member such that the sandwiching members are movable in an axial direction of the transport member and rotatable in a circumferential direction of the transport member.

In a transport apparatus described in claim 18, a groove in which the supporting guide is fitted is formed on an inner peripheral surface of a pair of the sandwiching member.

A transport apparatus described in claim 19 comprises a cylindrical transport member; a cylindrical rotary member accommodated inside the transport member; a magnetic force generation portion formed on the rotary member linearly in an axial direction of the rotary member and generating a magnetic field over a peripheral surface of the transport member; a supporting guide spirally formed on the peripheral surface of the transport member; a transfer path for transferring an object of transporting transported along the supporting guide to a place at a certain distance apart from the transport member; and a supporting means for supporting the transfer path at a predetermined position of the transport member. In this construction, the rotary member rotates such that the object of transporting is transported in a lead angle direction of the supporting guide, thus causing the object of transporting to be magnetically attracted to the peripheral surface of the transport member, with the result that the object of transporting are transported in an axial direction of the transport member along the supporting guide. In this construction, the supporting means has a pair of sandwiching members for sandwiching the circumference of the transport member and a clamping means for clamping a pair of the sandwiching members to the transport member; and a pair of the sandwiching members is mounted on the transport member such that the sandwiching members is movable in an axal direction of the transport member and rotatable in a circumferential direction of the transport member; and a plurality of coil-shaped grooves fitted in the supporting guide and having a width greater than the diameter of the supporting guide and a plurality of contact portions, which contact the peripheral surface of the transport member, are formed on a pair of the sandwiching members.

In a transport apparatus described in claim 20, a mounting means for mounting the sandwiching members on the transfer path is provided on a pair of the sandwiching members.

A transport apparatus described in claim 21 further comprises a guide container which stores the object of transporting in the guide container temporarily and supplying the object of transporting to the transport member and is rotatable in the same direction as a rotation direction of the rotary member around the transport member.

In a transport apparatus described in claim 22, the transport member stands vertically so that the object of transporting are transported from one side of the transport member to the other side of the transport member in the axial direction of the transport member along the supporting guide.

In the transport apparatus described in claims 1 through 8, the magnetic force generation portion generates magnetic lines of force. Consequently, a magnetizing force acts over the peripheral surface of the transport member, thus generating a magnetic field over the peripheral surface of the transport member. Therefore, objects of transporting (such as, parts) are magnetically attracted to the peripheral surface of the transport member. Further, due to the rotation of the rotary member, the object of transporting moves in the axial direction of the transport member along the supporting guide.

In the transport apparatus described in claim 2, the supporting guide is formed spirally from one side of the transport member to the other side of the transport member in the axial direction of the transport member. Thus, the object of transporting can be effectively moved in the axial direction of the transport member.

In the transport apparatus described in claim 5, because the yoke strip is formed on the surface of the magnet strip or strips, magnetic lines of force emitted by the magnet strip or strips concentrate on the yoke strip, thus intensifying the magnetic flux density.

In the transport apparatus described in claim 6, the object of transporting being transported in the axial direction of the transport member is transferred to a place at a certain distance apart from the transport member.

In the transport apparatus described in claim 7, because the transport member stands vertically, the object of transporting are vertically transported from one side of the transport member to the other side of the transport member in the axial direction of the transport member along the supporting guide. This construction allows the installation space of the transport member to be small.

In the transport apparatus described in claim 8, because a plurality of supporting strips is formed on the supporting guide, the object of transporting can be reliably supported. Therefore, the object of transporting can be transported reliably along the supporting guide.

The transport apparatus described in claims 1 through 8 has a simple construction and yet is capable of transporting the object of transporting successively in a desired direction. The space of the transport apparatus described in claim 7 is minimized space, but the transport apparatus recited in such claim 7 is capable of transporting the object of transporting successively vertically.

In the transport apparatus described in claims 9 through 15, the guide container stores the object of transporting therein temporarily, thus supplying them to the transport member. The magnetic force generation portion generates magnetic lines of force. Consequently, a magnetizing force acts over the peripheral surface of the transport member, thus generating a magnetic field over the peripheral surface of the transport member. Therefore, the object of transporting are magnetically attracted to the peripheral surface of the transport member. Further, due to the rotation of the rotary member, the object of transporting move in the axial direction of the transport member along the supporting guide. The prevention means prevents the object of transporting transported from the guide container to the transport member from being bridged with each other.

In the transport apparatus described in claim 10, the transfer means transfers the object of transporting in the transport direction of the supporting guide along the transport direction thereof. In this case, the object of transporting are moved upward along the spiral supporting guide.

In the transport apparatus described in claim 11, the object of transporting are stirred around the transport member by the stirring means and transferred upward along the supporting guide.

In the transport apparatus described in claim 12, the object of transporting are shakend by the shake means and transferred upward along the spiral supporting guide.

In the transport apparatus described in claim 13, because the guide container is rotated around the transport member by the rotation means and the object of transporting are transferred upward along the spiral supporting guide.

That is, in the transport apparatus described in claims 10 through 13, the object of transporting are moved to the lead angle direction of the spiral supporting guide by means of the transfer means, the stirring means, the shake means, and the rotation means, with the object of transporting being magnetically attracted to the peripheral surface of the transport member. Thus, the object of transporting can be prevented from being bridged with each other. That is, in the transport apparatus described in claims 10 through 13, the object of transporting supplied from the guide container to the transport member can be prevented from being bridged with each other.

Unlike the transport apparatus described in claim 9, in the transport apparatus described in claim 14, a magnetic field is generated over the peripheral surface of the transport member by a magnet. The guide container rotates in the direction in which the rotation means presses the object of transporting upward along the supporting guide. In this case, when the supporting guide is spiraled clockwise, the guide container rotates in the direction of the right-handed screw; whereas, when the supporting guide is spiraled counterclockwise, the guide container rotates in the direction of the left-handed screw. That is, in the transport apparatus described in claim 14, the object of transporting are transferred upward along the lead angle direction of the spiral supporting guide by the rotation of the guide container. Thus, the object of transporting supplied from the guide container to the transport member can be prevented from being bridged with each other.

Unlike the transport apparatus described in claims 9 through 14, in the transport apparatus described in claim 15, because the transport member stands vertically, the object of transporting are vertically transported from one side of the transport member to the other side of the transport member in the axial direction thereof along the supporting guide. This construction allows the installation space of the transport member to be small.

The transport apparatus described in claims 9 through 15 has a simple construction and a minimized installation space, but is capable of transporting the object of transporting vertically successively. Further, the transport apparatus is capable of transporting the object of transporting without the object of transporting being bridged with each other.

In the transport apparatus described in claim 16, the object of transporting are transported by the transport means extending from one side of the transport apparatus to the other side thereof and transferred to a place at a certain distance apart from the transport member through the transfer path. The transfer path is supported by the supporting means at a predetermined position of the transport path. In this case, the transport path of the transport means is sandwiched between a pair of sandwiching members, and the clamping means clamps the sandwiching members to the transport path. Further, a pair of the sandwiching members is mounted on the transport path at any desired positions in the transport direction of the transport path and in the circumferential direction thereof.

Unlike the transport apparatus described in claim 16, in the transport apparatus described in claim 17, the magnetic force generation portion generates magnetic lines of force. Consequently, a magnetizing force acts over the peripheral surface of the transport member, thus generating a magnetic field over the peripheral surface of the transport member. Therefore, the object of transporting are magnetically attracted to the peripheral surface of the transport member. Further, due to the rotation of the rotary member, the object of transporting move in the axial direction of the transport member along the supporting guide. In the supporting means for supporting the transfer path at a predetermined position of the transport member for transferring the object of transporting to a place at a certain distance apart from the transport member, a pair of the sandwiching members of the supporting means is mounted on the transport member such that the sandwiching members are movable in the axial direction of the transport member and rotatable in the circumferential direction thereof. Therefore, the sandwiching members are mounted on the transport member at a desired position in the axial direction and in the circumferential direction of the transport member by the clamping means.

In the transport apparatus described in claim 18, the supporting guide is fitted in the spiral grooves formed on the inner peripheral surface of a pair of the sandwiching member and the supporting guide is held from around the transport member.

Unlike the transport apparatus described in claims 17 and 18, in the transport apparatus described in claim 19, the spiral grooves having widths greater than the radius of the supporting guide are formed on a pair of the sandwiching members. Therefore, the spiral supporting guide is circumferentially fitted in and held by the spiral grooves having different pitches and lead angles. Further, because the contact portion of a pair of the sandwiching members contacts the peripheral surface of the transport member, the transport member can be reliably sandwiched between the sandwiching members.

In the transport apparatus described in claim 20, the transfer path is installed between one of the ends of each of a pair of the sandwiching members by means of a mounting means.

In the transport apparatus described in claim 21, the guide container stores parts therein temporarily and supplies the object of transporting to the transport member. With the rotation of the guide container around the transport member in the same direction as the rotation direction of the rotary member, the object of transporting are transported upward along the lead angle direction of the spiral supporting guide. Thus, the object of transporting supplied from the guide container to the transport member can be prevented from being bridged with each other.

In the transport apparatus described in claim 22, because the transport member stands vertically, the objects of transporting are vertically transported from one side of the transport member to the other side of the transport member in the axial direction thereof along the supporting guide. This construction allows the installation space of the transport member to be small.

The transport apparatus described in claims 16 through 22 has a simple construction, but is capable of transporting the object of transporting successively in a desired direction. Further, the object of transporting can be transferred in any desired directions from a desired take-out position of the transport path to a required place at a certain distance apart from the transport member.

In the transport apparatus described in claim 19, the spiral grooves having widths greater than the radius of the supporting guide firmly hold the supporting guide having different pitches and lead angles. Further, because the contact portion of the sandwiching members contacts the peripheral surface of the transport member, the transport member can be reliably sandwiched between the sandwiching members.

In the transport apparatus described in claim 21, with the rotation of the guide container around the transport member in the same direction as the rotation direction of the rotary member, the object of transporting are transported upward along the lead angle direction of the spiral supporting guide. Thus, the object of transporting can be prevented from being bridged with each other.

The above and further objects, feature, aspects, and advantages of the present invention will be more fully apparent from the following detailed description with the accompanying drawings.

BRIEF DESCRIPTION OF THE DRAWINGS

FIG. 7(A) is a plan view showing a sandwiching member of a supporting means to be applied to the transport apparatus of FIG. 1.

FIG. 7(B) is a front view showing the sandwiching member of FIG. 7(A).

FIG. 7(C) is a side view showing the sandwiching member of FIG. 7(A).

FIGS. 19(A), 19(B), and 19(C) are main portion-depicted front views showing modifications of a supporting guide to be applied to the transport apparatus.

FIGS. 20(A), 20(B), and 20(C) are main portion-depicted front views showing modifications of a rotary yoke to be applied to the transport apparatus.

DESCRIPTION OF THE PREFERRED EMBODIMENTS

Figure 1:
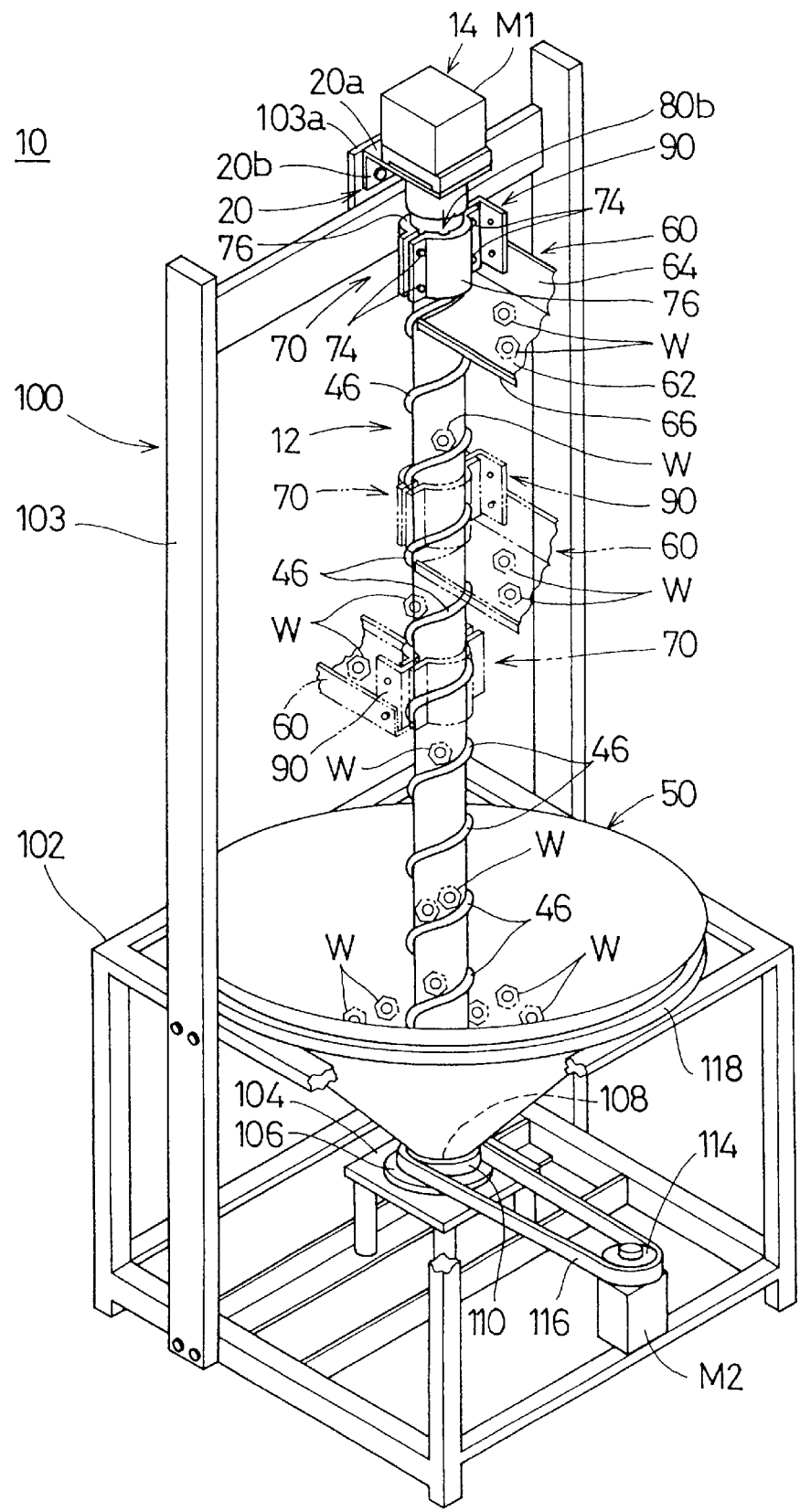
FIG. 1 is a perspective view showing a transport apparatus according to an embodiment of the present invention.
Figure 2A:
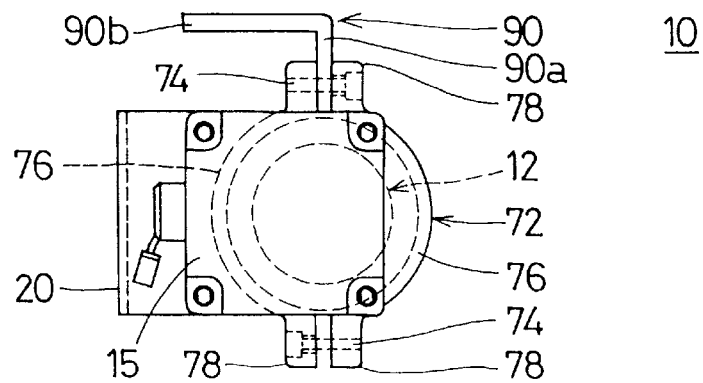
FIG. 2(A) is a plan view showing main portions of a transport member to be applied to the transport apparatus shown in FIG. 1.
Figure 2B:
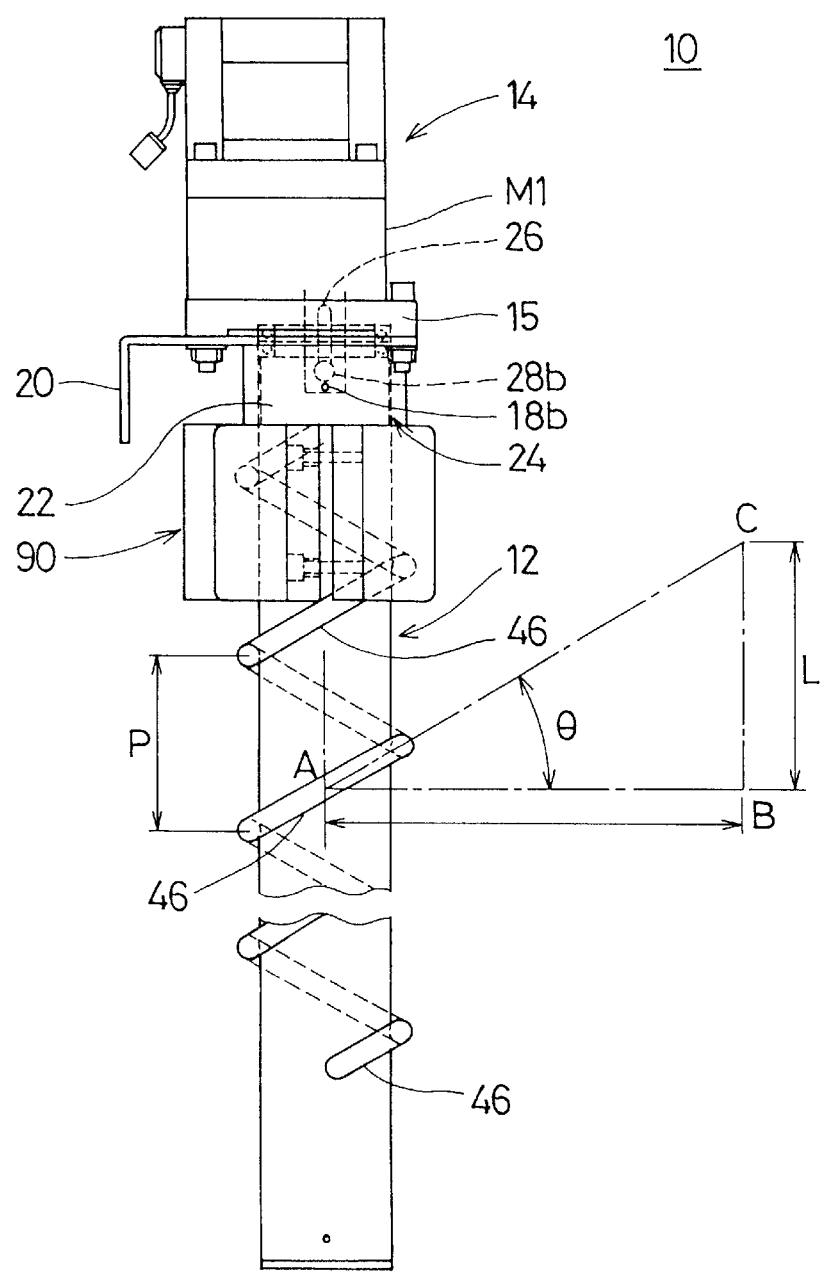
FIG. 2(B) is a front view showing the transport apparatus shown in FIG. 1.
Figure 3:
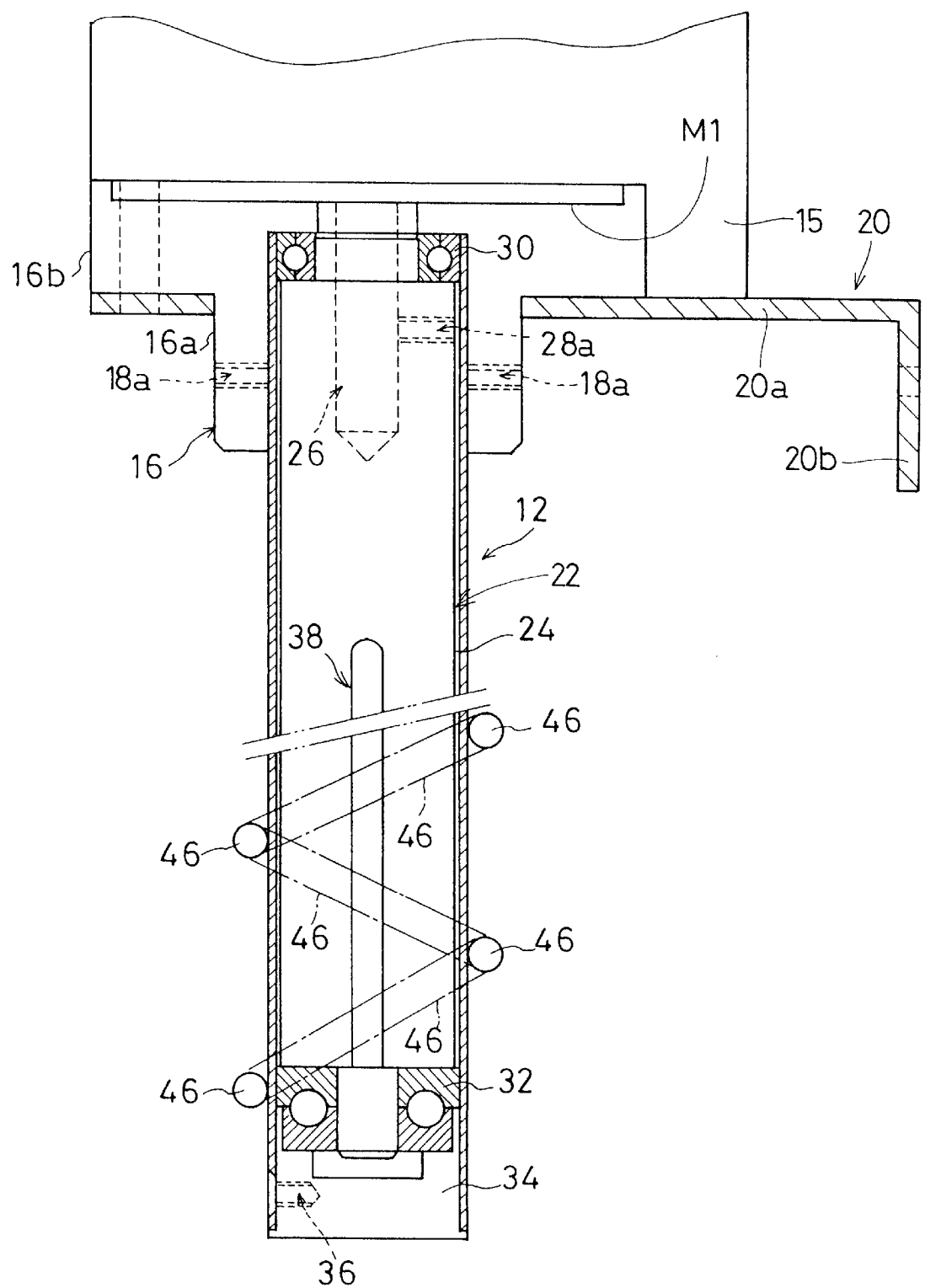
FIG. 3 is a partly enlarged vertical longitudinal sectional view showing schematically the installed state of the transport member to be applied to the transport apparatus shown in FIG. 1.

FIG. 1 is a perspective view showing a transport apparatus according to an embodiment of the present invention. FIG. 2(A) is a plan view showing main portions of a transport member to be applied to the transport apparatus shown in FIG. 1. FIG. 2(B) is a front view showing the transport apparatus shown in FIG. 1. FIG. 3 is a partly enlarged vertical longitudinal sectional view showing schematically the installed state of the transport member to be applied to the transport apparatus shown in FIG. 1.

The transport apparatus 10 comprises a cylindrical transport member 12 made of, for example, a non-magnetic material. The transport member 12 serves as a transport path for transporting parts W as an object of transporting. The transport member 12 is made of synthetic resin or non-ferrous metal (such as, aluminum alloy, brass, stainless steel or the like). In this embodiment, the transport member 12 stands vertically to transport the parts W upward from a lower portion of the transport member 12 toward the upper end of the transport member 12 in the axial direction of the transport member 12. In this embodiment, the transport member 12 is formed of a stainless steel pipe of SUS304. The non-magnetic material to be used in the embodiment includes paramagnetic substances which are not magnetized so intensely as ferromagnetic substances such as iron, nickel, cobalt, and the like.

Referring to FIG. 1, FIG. 2 and FIG. 3, at the upper end of the transport member 12 in its axial direction, there is provided a motor-installing mount 15 for installing thereon a motor driver unit 14 accommodating a motor M1 for rotating a rotary shaft 24 which will be described later. As shown in FIG. 1, FIG. 2 and FIG. 3, the motor M1 fixed to the motor-installing mount 15 is connected with the rotary shaft 24 through a flange 16. A plurality of screw holes 18a is formed through a barrel 16a of the flange 16 from the peripheral surface of the barrel 16a to the inner end of the barrel 16a. As shown in FIG. 2(B), the transport member 12 is fixed to the flange 16 by means of setscrews 18b to be screwed into the screw holes 18a. A fixing member 20 for fixedly supporting the motor M1 thereon is fixed to the flange 16. The fixing member 20 in the form of a plate is approximately L-shaped in section. The longer side 20a of the fixing member 20 is fixed to a flange head 16b (see FIG. 3) of the flange 16 by a fixing means (such as, welding, a bolt and nut or the like). As shown in FIG. 1, the shorter side 20b of the fixing member 20 which supports the motor driver unit 14 is fixed to a desired place. In this embodiment, by means of a fixing means such as a bolt and nut, the shorter side 20b of the fixing member 20 is fixed to a strip 103a mounted on a frame member 103 of a frame 100 which supports the entire transport apparatus 10. The frame 100 will be described later.

A rotary yoke 22 is provided inside the transport member 12. The rotary yoke 22 comprises the cylindrical rotary shaft 24 and a magnetic force generation portion 38 which will be described later. The rotary shaft 24 is formed of non-ferrous metal such as aluminum alloy, brass or the like or a synthetic resin material. The upper end of the rotary shaft 24 in the axial direction thereof is rotatably connected with a driving shaft (not shown) of the motor M1.

Referring to FIG. 3, an installation hole 26 for mounting the rotary shaft 24 on the motor M1 is formed in the rotary shaft 24 at the upper end of the rotary shaft 24 in the axial direction thereof. A screw hole 28a is also formed in the rotary shaft 24 at a position proximate to the upper end of the rotary shaft 24 in its axial direction from the peripheral surface of the rotary shaft 24 to the installation hole 26, thus communicating with the installation hole 26. The driving shaft (not shown) of the motor M1 is inserted into the installation hole 26 to connect it with the rotary shaft 24 by means of a setscrew 28b screwed into the screw hole 28a. The upper end of the rotary shaft 24 in its axial direction is rotatably supported by a bearing 30, while the lower end of the rotary shaft 24 in its axial direction is rotatably supported by a bearing 32. A bush 34 is inserted into the lower end of the transport member 12 in its axial direction and fixed thereto by a machine screw 36. The bush 34 may be fixed to the lower end of the transport member 12 in its axial direction by welding or caulking.

Figure 4A:
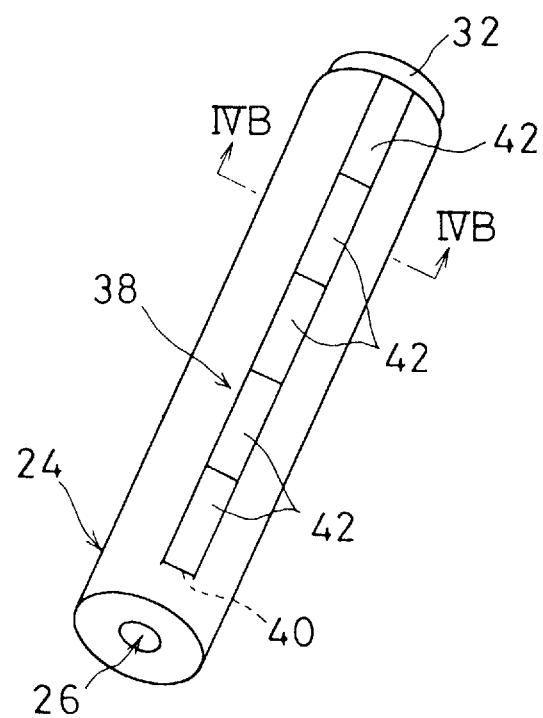
FIG. 4(A) is a perspective view showing a rotary member of the transport apparatus shown in FIG. 1.
Figure 4B:
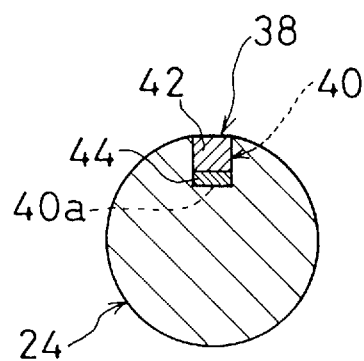
FIG. 4(B) is a sectional view taken along a line IVB—IVB of FIG. 4(A).
Figure 4C:
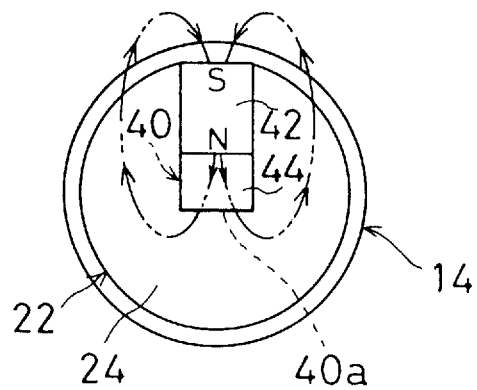
FIG. 4(C) is a plan view showing schematically the flow of a magnetic flux emitted from a magnetic force generation portion.

As shown in FIGS. 3 and 4(A), the magnetic force generation portion 38 extending straight along the axial direction of the rotary shaft 24 is formed on a part of the peripheral surface of the rotary shaft 24. That is, a row of a groove 40 extending straight from the upper end of the rotary shaft 24 toward the lower end of the rotary shaft 24 in its axial direction is formed on the peripheral surface of the rotary shaft 24. As shown in FIG. 4(B), the groove 40 is U-shaped in section. The groove 40 accommodates a plurality of rectangular magnet strips 42 and yoke strips 44. In this embodiment, the magnet strip 42 consists of a permanent magnet.

The magnetic force generation portion 38 may be composed of an electromagnet to generate a magnetic field. The magnetic force generation portion 38 may be circular or spiral along the axial direction of the rotary shaft 24.

Magnet strips 42, extending along the axial direction of the rotary shaft 24 are fixed to the bottom surface 40a of the groove 40 by a fixing means such as adhesive agent, with the magnet strips 42 arranged in a row. One yoke strip 44 consisting of a ferromagnetic substance such as iron is fixed to the lower surface of each of the magnet strips 42 with adhesive agent or the like. The lower surface of the magnet strip 42 in its thickness direction is formed as the negative pole, while the upper surface of the magnet strip 42 in its thickness direction is formed as the positive pole. In this embodiment, the surface of the magnet strip 42 positioned at the bottom surface side of the groove 40 is formed as the negative pole, while the surface of the magnet strip 42 positioned at the side opposite to the bottom surface side of the groove 40 is formed as the positive pole. But it is possible to form the surface of the magnet strip 42 positioned at the bottom surface side of the groove 40 as the positive pole and form the surface thereof positioned at the side opposite to the bottom surface side thereof as the negative pole.

In this embodiment, because the yoke strip 44 is mounted on the lower surface of the magnet strip 42 in its thickness direction, magnetic fluxes (magnetic lines of force) emitted from the positive pole of the magnet strip 42 pass through the yoke strip 44 which transmits the magnetic fluxes more than air, and thus flow through the peripheral surface of the transport member 12 and enter into the negative pole. The provision of the yoke strip 44 causes the magnetic lines of force to be longer compared with the case in which the magnet strip 42 is not provided with the yoke strip 44, thus allowing the range which is applied by a magnetizing force generated by the magnetic force generation portion 38 to be wider. Further, the provision of the yoke strip 44 allows the magnetic lines of force to be concentrated and the magnetic flux density to be high, thus intensifying the magnetizing force.

In this embodiment, the magnetic poles are arranged linearly on the groove 40 along the axial direction of the rotary shaft 24. The magnetic poles are arranged on the upper and lower surfaces of the magnet strips 42 in the thickness direction of the rotary shaft 24. But the magnetic poles may be formed at both end surfaces of each magnetic strip 42 in the longitudinal direction thereof. In this case, the magnetic strips 42 are preferably arranged in such a manner that the polarities of the magnet poles of magnetic strips 42 adjacent to each other are the same.

A supporting guide 46 is formed on the peripheral surface of the transport member 12 from the lower end thereof toward the upper end thereof in the axial direction of the transport member 12. The supporting guide 46 is made of a non-magnetic material and wound spirally or circularly on the peripheral surface of the transport member 12. In this embodiment, the supporting guide 46 is formed of, for example, a wire circular in section.

The supporting guide 46 has a function of supporting the parts W such as steel balls, hexagon nuts, hexagon head bolts or the like and also serves as a transport path in transporting the parts W upward in the axial direction of the transport member 12 along the supporting guide 46. In cooperation with the magnetic attraction force generated by the magnetic force generation portion 38 of the rotary yoke 22, the supporting guide 46 supports the parts W. In this embodiment, the supporting guide 46 transports the parts W vertically upward from the lower end of the transport member 12 in the axial direction of the transport member 12, namely, the side at which the parts W are supplied toward the upper end of the transport member 12 in its axial direction.

As shown in FIG. 1, in the embodiment, the transport apparatus 10 comprises a funnel-shaped hopper 50 as a guide container supported at the lower end of the transport member 12 to store the parts W in the hopper 50 temporarily and guide the parts W toward the lower side of the transport member 12 in its axial direction. The hopper 50 of this embodiment shown in FIG. 1 is rotatably supported by the frame 100.

Referring to FIG. 1, the frame 100 includes, for example, a box-shaped frame body 102. A U-shaped frame member 103 is mounted on the frame body 102 such that the frame member 103 extends upward from opposed both sides of the frame body 102. The shorter side 20b of the fixing member 20 for supporting the motor driver unit 14 is fixed to the frame member 103.

Referring to FIG. 1, a rectangular fixing plate 104 is installed on the frame body 102 at a lower portion of the frame body 102. The lower end of the transport member 12 in the axial direction of the transport member 12 is fixed to the fixing plate 104 by a fixing means such as a bolt 105 through an installing flange 106.

Figure 5:
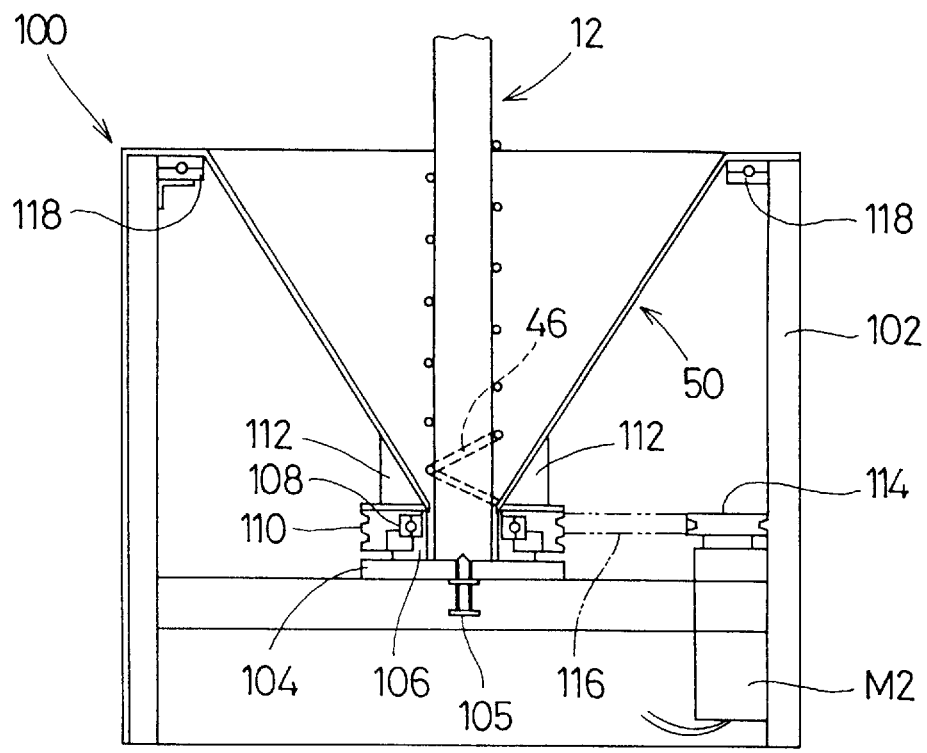
FIG. 5 is a main portion-depicted front view showing schematically a guide container and members in the periphery thereof to be applied to the transport apparatus of FIG. 1.
Figure 6:
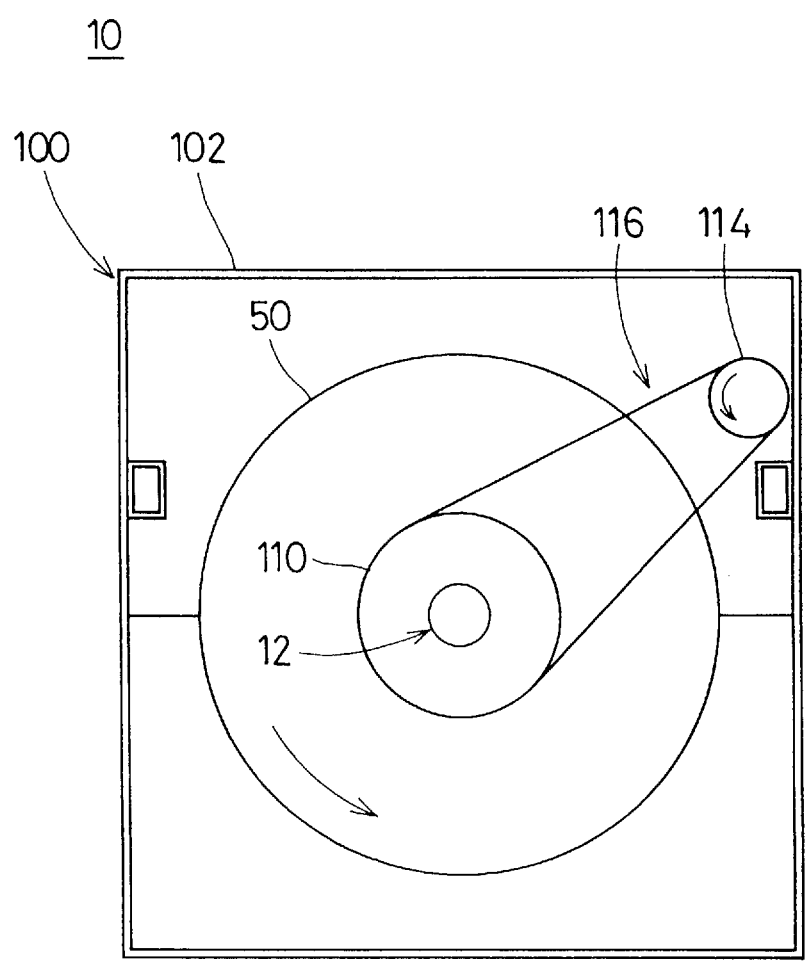
FIG. 6 is a main portion-depicted bottom view showing schematically the guide container and members in the periphery thereof to be applied to the transport apparatus of FIG. 1.

Referring to FIGS. 1 and 5, a pulley 110 is rotatably supported by a bearing 108 at the lower end of the transport member 12 in the axial direction of the transport member 12 through a connection strip 112. A motor M2 for rotating the hopper 50 is provided at a lower portion of the frame body 102. A pulley 114 is installed on the driving shaft of the motor M2. A belt 116 is spanned between the pulley 110 and the pulley 114. Further, the upper end of the hopper 50 is rotatably supported by bearings 118 installed at the upper end of the frame body 102.

In this embodiment, transmission members such as the pulleys and the belt are used to transmit the driving force of the motor M2 to the hopper 50. But the transmission members are not limited to the pulleys and the belt. For example, a transmission device having a chain and a sprocket may be used.

Thus, the power of the motor M2 is transmitted sequentially to the pulley 114, the belt 116, and the pulley 110, thus rotating the hopper 50. That is, in this embodiment, the hopper-rotating means comprising the bearings 108, 118, the pulleys 110, 114, the belt 116, and the motor M2 constitutes a means for preventing the parts W from being bridged with each other.

In this embodiment, a plurality of parts W stored temporarily in the hopper 50 is stirred to prevent the parts W from being bridged with each other by operating the hopper-rotating means and then transported upward along the spiral supporting guide 46 of the transport member 12. That is, the hopper-rotating means has a function of stirring the parts W and transporting them upward along the lead angle direction of the spiral supporting guide 46.

Referring to FIG. 1, the transport member 12 is provided with a transfer path 60 to transfer the parts W being transported from the lower side of the transport member 12 toward the upper side of the transport member 12 in its axial direction to a place at a certain distance apart from the transport member 12. The transfer path 60 is made of, for example, a synthetic material or a non-ferrous metallic material such as brass, duralumin, aluminum or the like and installed on the peripheral surface of the transport member 12 at a desired position between the lower and upper ends of the transport member 12. In this embodiment, the transfer path 60 is installed on the peripheral surface of the transport member 12 at a position proximate to the upper end of the transport member 12.

The transfer path 60 includes a rectangular flat transfer plate 62, for example, as shown in FIG. 1. A rectangular guide plate 64 extends upwardly vertically from one end of the transfer plate 62 in the width direction of the transfer plate 62. In addition, the transfer plate 62 has a holding strip 66 projecting upward from the other end of the transfer plate 62 in its width direction. The transfer plate 62, the guide plate 64, and the holding strip 66 are integrally formed of, for example, a non-magnetic material such as a synthetic resin material to form the approximately L-shaped transfer path 60.

As shown in FIG. 1, a supporting tool 70 as a supporting member supports the transfer path 60 at a predetermined position of the transport member 12 in the axial direction of the transport member 12.

The supporting tool 70 comprises a pair of sandwiching members 72 and 72. The sandwiching members 72 and 72 are clamped to the transport member 12 from both sides of a diametral direction of the transport member 12, by a clamping means, as shown in FIG. 2(A). Referring to FIG. 2(A), In this embodiment, a clamping tool 74 consisting of, for example, a bolt and nut is used as the clamping means.

Figure 8:
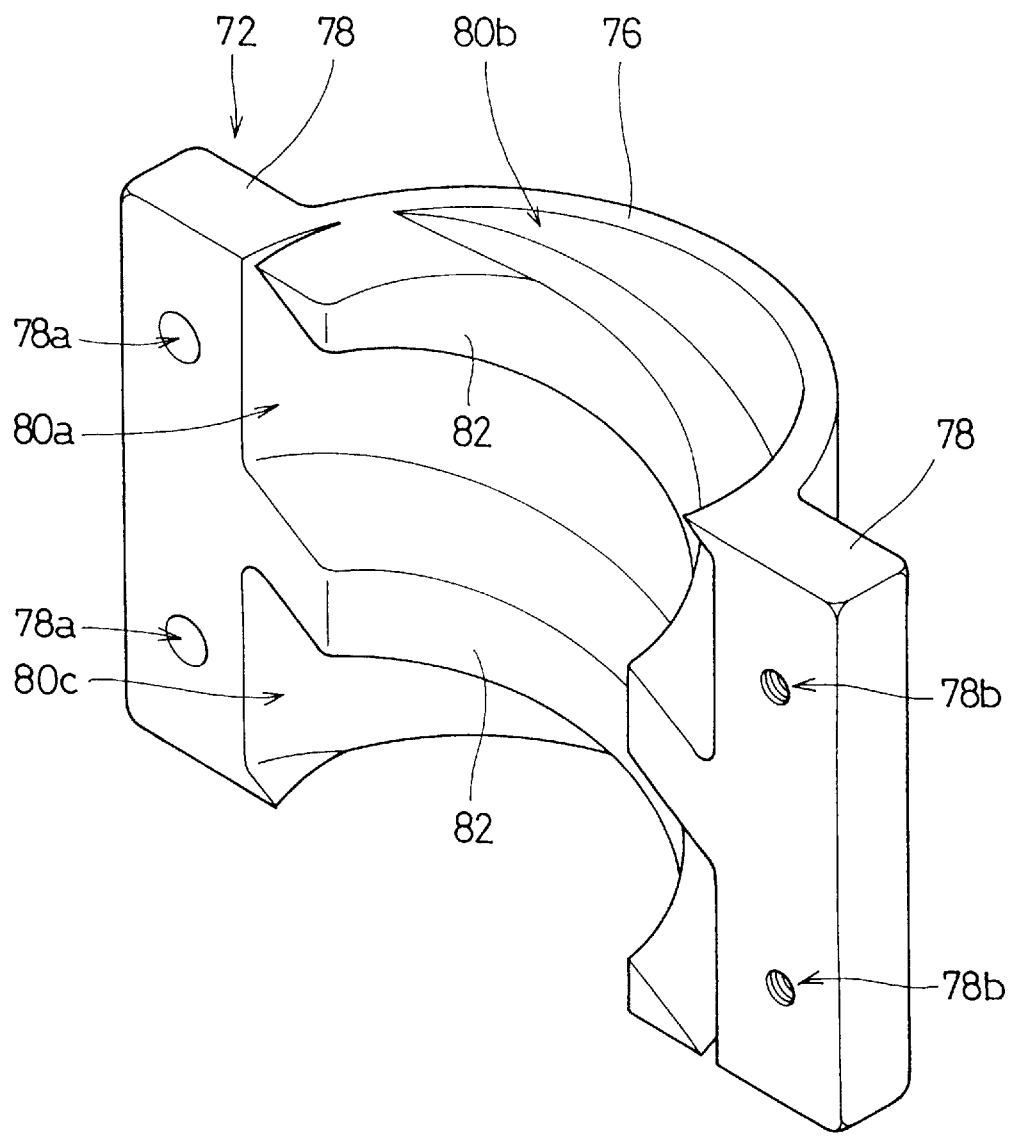
FIG. 8 is a perspective view showing the sandwiching member of the supporting means to be applied to the transport apparatus of FIG. 1.

As shown in FIGS. 7 and 8, for example, the sandwiching member 72 comprises a semi-cylindrical sandwiching portion 76. Rectangular clamping portions 78 and 78 extend sideways from both ends of the sandwiching portion 76.

Grooves 80a, 80b, and 80c in which the supporting guide 46 is fitted are formed on the inner peripheral surface of the sandwiching portion 76. The grooves 80a, 80b, and 80c have widths greater than the diameter of the supporting guide 46. As shown in FIG. 2, the configuration of each of the grooves 80a, 80b, and 80c correspond to that of the supporting guide 46 so that the spiral supporting guide 46 having a lead angle θ, a pitch P, and a lead L can be fitted in the grooves 80a, 80b, and 80c. Further, contact portions 82 and 82 which contact the peripheral surface of the transport member 12 are formed on the inner peripheral surface of the sandwiching portion 76 between the grooves 80a and 80b and between the grooves 80a and 80c.

The width of the groove 80a positioned at the center of the sandwiching portion 76 in its axial direction is set to be greater than that of the grooves 80b and 80c positioned at its upper and lower sides in the axial direction of the sandwiching portion 76, respectively. Accordingly, the sandwiching portion 76 is applicable to the supporting guides 46 having various pitches P and lead angles θ. That is, the transport member 12 can be fitted in the sandwiching portion 76 even though the supporting guide 46 to be mounted on the transport member 12 has different pitches P and lead angles θ.

In this embodiment, the supporting guide 46 having a pitch P of 80 mm to 110 mm and a lead angle θ of 30° and 38° can be fitted in the grooves 80a, 80b, and 80c. Further, because the contact portions 82 and 82 are formed between the grooves 80a and 80b and between the grooves 80a and 80c, a pair of the sandwiching portions 76 and 76 can be reliably mounted on the transport member 12, with the transport member 12 sandwiched between the sandwiching portions 76 and 76.

The clamping portions 78 and 78 have clamping holes 78a and 78a and 78b and 78b formed thereon, respectively to insert the clamping tool 74 thereinto to clamp the sandwiching members 72 and 72 to the transport member 12, with the transport member 12 surrounded with a pair of the sandwiching portions 76 and 76. The clamping holes 78a and 78a are spaced at a predetermined interval in the lengthwise direction of one clamping portion 78. Similarly, the clamping holes 78b and 78b are spaced at a predetermined interval in the lengthwise direction of the other clamping portion 78. A female screw portion is formed on the inner peripheral surface of the clamping holes 78b and 78b, whereas a female screw portion is not formed on the clamping holes 78a and 78a. The clamping holes 78a, 78a form a clearance hole, in a word.

Thus, a pair of the sandwiching members 72 and 72 is clamped to the transport member 12 from both side of the diametral direction of the trancport member 12, by means of the clamping tool 74 such as a bolt and nut. The sandwiching members 72 and 72 is movable vertically in the axial direction of the transport member 12 by loosening the clamping tool 74. The sandwiching members 72 and 72 are rotatable in the circumferential direction of the transport member 12 in the state of loosening the clamping tool 74.

An L-shaped auxiliary member 90 serving as a means for mounting the transfer path 60 on the transport member 12 is mounted on the supporting tool 70. The shorter side 90a of the auxiliary member 90 is fixed to the supporting tool 70 by means of the clamping tool 74, with the shorter side 90a sandwiched between one of the clamping portions 78 and 78 of a pair of the sandwiching members 72 and 72, as shown in FIG. 2(A). The guide plate 64 of the transfer path 60 is fixed to the longer side 90b of the auxiliary member 90.

In the transport apparatus 10 of this embodiment, the transfer path 60 is installed on the transport member 12, using the auxiliary member 90, but may be removably mounted on the clamping portions 78 and 78 of a pair of the sandwiching members 72 and 72 by a fixing means such as a bolt and nut.

Referring to FIG. 1, in the transport apparatus 10 of this embodiment, the parts W (such as, steel balls, hexagon nuts, hexagon head bolts, torsion coil springs or the like), stored temporarily in the hopper 50, are supplied to the lower end of the transport member 12 in its axial direction. The parts W supplied to the transport member 12 are transported vertically upwardly in the axial direction of the transport member 12.

That is, the motor M1 is driven to rotate the rotary shaft 24. As a result, the magnetizing force generated by the magnetic force generation portion 38 of the rotary shaft 24 acts over the entire peripheral surface of the transport member 12, thus generating a magnetic field. Therefore, the parts W can be magnetically attracted to the peripheral surface of the transport member 12. Further, because the supporting guide 46 is spirally mounted on the peripheral surface of the transport member 12, the parts W attracted to the peripheral surface of the transport member 12 are sequentially transported from the lower end of the transport member 12 toward the upper end of the transport member 12 in its axial direction along the spiral supporting guide 46, with the rotation of the rotary shaft 24.

In the transport apparatus 10 of this embodiment, even the parts W (such as, steel balls) which contact the transport member 12 in a small area (i.e., contact it at a point), can be supported by means of the supporting guide 46 on the peripheral surface of the transport member 12. Thus, the parts W can be reliably fed upward along the peripheral surface of the transport member 12. Further, in the transport apparatus 10 of this embodiment, the rotary shaft 24 accommodated in the transport member 12 rotates, whereas the transport member 12 is stationary. Thus, the transport apparatus 10 is very safe. That is, an operator is not injured even though the operator touches the transport member 12.

Moreover, in this embodiment, when the motor M2 is driven, the hopper 50 and the rotary shaft 24 rotate in the same direction. Thus, the parts W supplied from the hopper 50 to the transport member 12 are stirred around the transport member 12, thus being sequentially transported upward along the supporting guide 46 having the lead angle θ. The part W as the object of transporting are transported along the lead angle θ direction of the supporting guide 46.

Accordingly, in the transport apparatus 10 of this embodiment, the parts W supplied from the hopper 50 to the transport member 12 can be prevented from being bridged with each other while they are being transported along the supporting guide 46.

Further, the parts W being transported upward along the supporting guide 46 are brought into contact with the guide plate 64 of the transfer path 60 and fed along the transfer plate 62 under the guidance of the guide plate 64. That is, the parts W taken out from the transport member 12 are transferred to a desired place at a certain distance apart from the transport member 12 through the transfer path 60.

Further, in the transport apparatus 10 of this embodiment, because the supporting tool 70 and the auxiliary member 90 are provided, the transfer path 60 can be mounted at desired positions in the axial direction of the transport member 12 and in any directions in the circumferential direction of the transport member 12. In other words, in the transport apparatus 10 of this embodiment, it is possible to arbitrarily alter the position and direction of the take-out position of the parts W being transported along the supporting guide 46.

Figure 9:
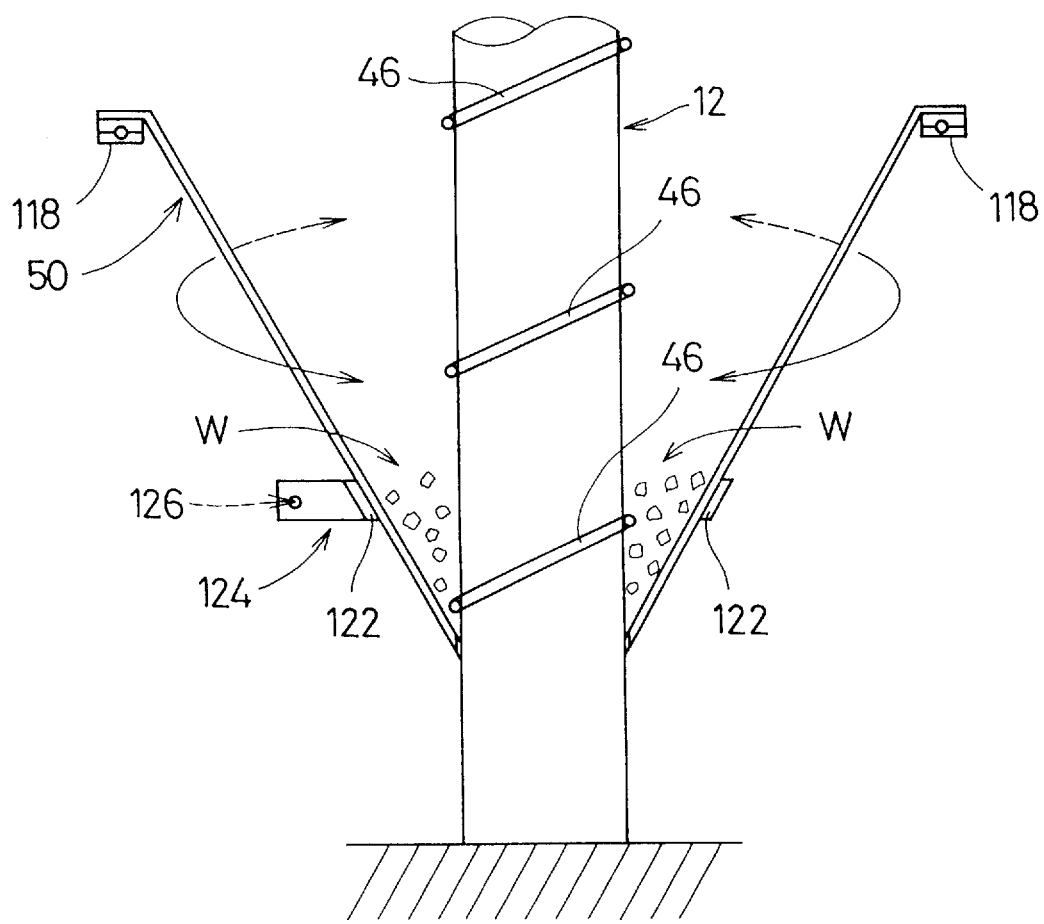
FIG. 9 is a main portion-depicted front view showing schematically a transport apparatus according to an embodiment of the present invention.
Figure 10:
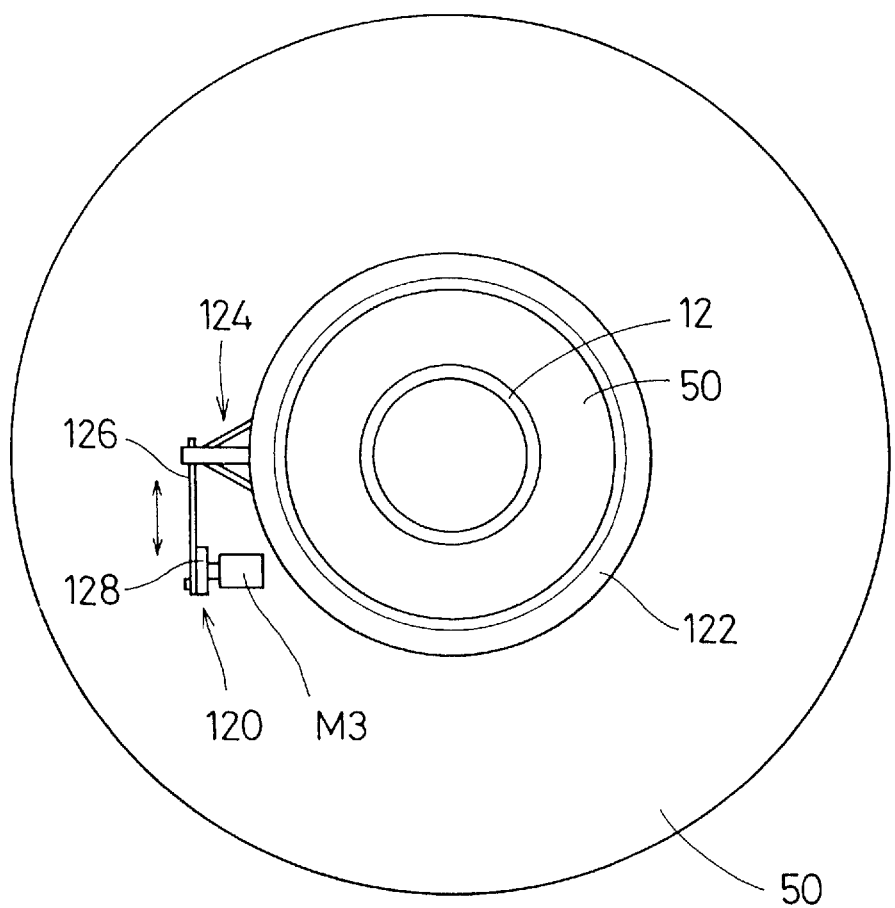
FIG. 10 is a main portion-depicted bottom view showing schematically the operation mechanism of a guide container to be applied to the transport apparatus shown in FIG. 9.

FIG. 9 is a main portion-depicted front view showing schematically a transport apparatus according to an embodiment of the present invention. FIG. 10 is a main portion-depicted bottom view showing schematically the operation mechanism of a guide container to be applied to the transport apparatus shown in FIG. 9. The transport apparatus 10 shown in FIG. 9 is different from that shown in FIG. 1 in the construction of the stirring means for preventing the parts W from being bridged with each other. The transport apparatus 10 shown in FIG. 1 comprises the rotation means for rotating the hopper 50 in the same direction as that of the rotary shaft 24 accommodated in the transport member 12, whereas the transport apparatus 10 shown in FIG. 9 comprises the rotation means for rotating the hopper 50 in the same direction as that of the rotary shaft 24 and in the direction opposite to the rotation direction of the rotary shaft 24 alternately.

Similarly to the transport apparatus 10 shown in FIG. 1, the hopper 50 is rotatably supported on the transport member 12 by means of a bearing 118. The hopper 50 is rotated clockwise and counterclockwise alternately cyclically by a cam device 120. That is, an annular flange head 122 is provided throughout the entire the periphery of the hopper 50 at a lower portion. The flange head 122 is fixed to a holding member 124. The holding member 124 is connected with a follower link 126 of the cam device 120. In the transport apparatus 10 shown in FIG. 9, a motor M3 is driven to rotate a cam 128 at a uniform speed. As a result, the follower link 126 reciprocates at a uniform speed. Accordingly, in the transport apparatus 10 shown in FIG. 9, the hopper 50 rotates clockwise and counterclockwise alternately cyclically. The transport apparatus 10 shown in FIG. 9 has an effect similar to that shown in FIG. 1.

Figure 11:
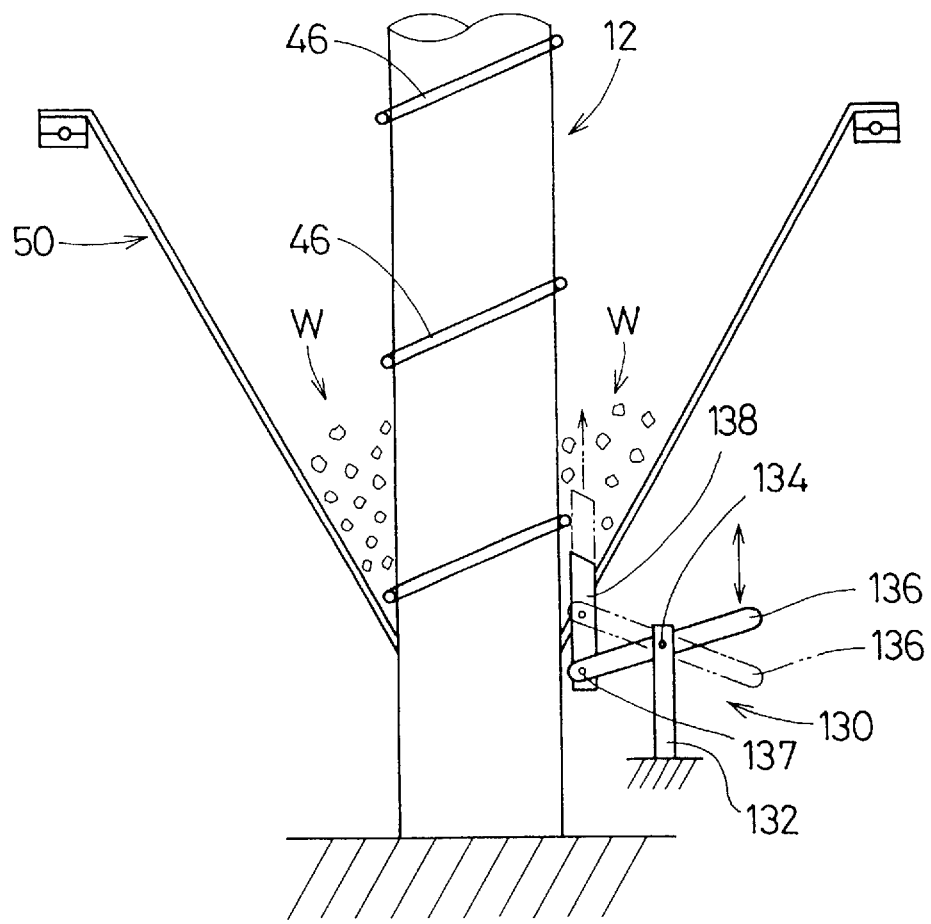
FIG. 11 is a main portion-depicted front view schematically showing a transport apparatus according to an embodiment of the present invention.

FIG. 11 is a main portion-depicted front view schematically showing a transport apparatus according to an embodiment of the present invention. The transport apparatus 10 shown in FIG. 11 is different from that shown in FIG. 1 in the construction of the means for preventing the parts W from being bridged with each other. In the transport apparatus 10 shown in FIG. 1, the hopper 50 is rotated to stir the parts W in the hopper 50, whereas in the transport apparatus 10 shown in FIG. 11, a lever device 130 is used as a shake means for shaking the parts W in the hopper 50.

In the transport apparatus 10 shown in FIG. 11, a shaking member 138 is inserted into a hole (not shown) formed on the peripheral surface of the hopper 50 at a position proximate to the lower end of the hopper 50. The shaking member 138 is fixed to an operation arm 136 of the lever device 130 with a pin 137, and the operation arm 136 is supported by a pillar 132 such that the operation arm 136 is rotatable on an axis 134. Thus, in the transport apparatus 10 shown in FIG. 11, the lever device 130 is driven to move the shaking member 138 vertically. As a result, the parts W in the hopper 50 are shaken. The transport apparatus 10 shown in FIG. 11 has also an effect similar to that shown in FIG. 1.

Figure 12:
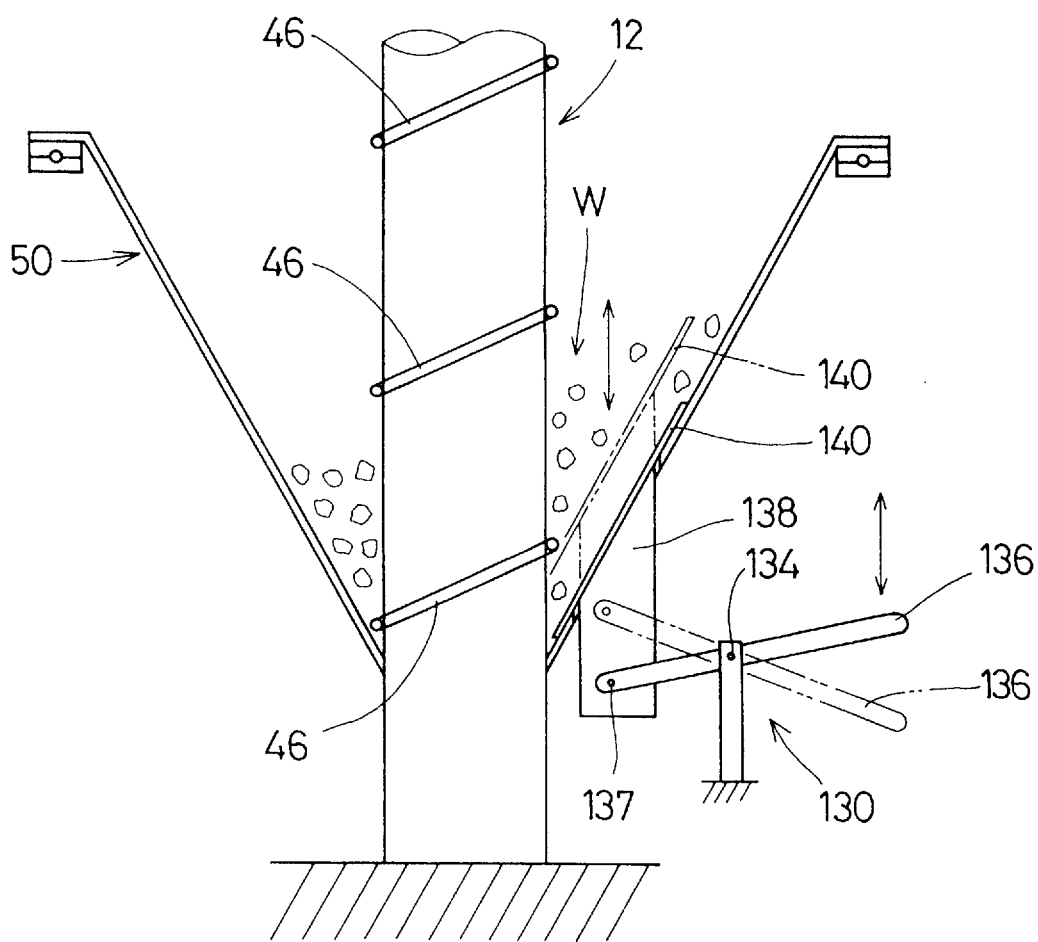
FIG. 12 is a main portion-depicted front view schematically showing a transport apparatus according to an embodiment of the present invention.

FIG. 12 is a main portion-depicted front view schematically showing a transport apparatus according to an embodiment of the present invention. The transport apparatus 10 shown in FIG. 12 is different from that shown in FIG. 11 in the construction of the shaking member 138. That is, a sheet-shaped member 140 consisting of an elastic material, for example, a spring is provided on the upper surface of the shaking member 138. The transport apparatus 10 shown in FIG. 12 is capable of shaking the parts W in a range wider than the apparatus shown in FIG. 11.

Figure 13:
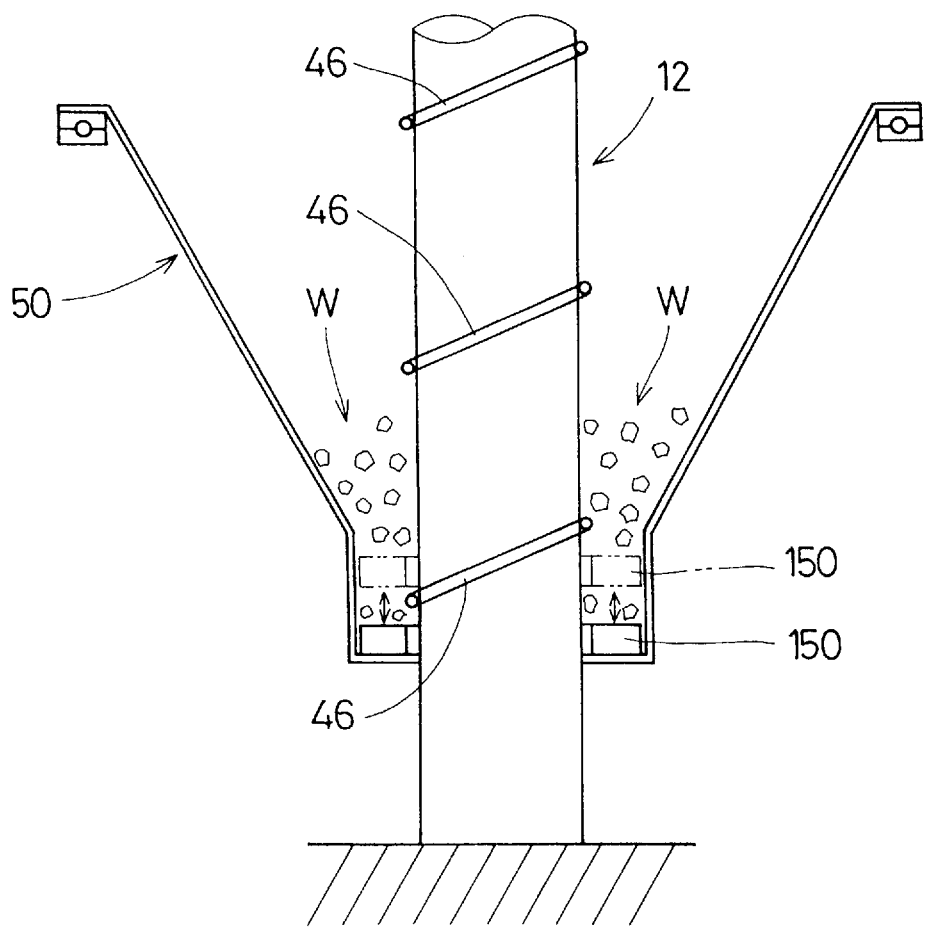
FIG. 13 is a main portion-depicted front view schematically showing a transport apparatus according to an embodiment of the present invention.

FIG. 13 is a main portion-depicted front view schematically showing a transport apparatus according to an embodiment of the present invention. The transport apparatus 10 shown in FIG. 13 is different from that shown in FIG. 11 and that shown in FIG. 12 in the construction of the shake means for preventing the parts W from being bridged with each other. That is, in the transport apparatus 10 shown in FIGS. 11 and that shown in FIG. 12, the parts W are shaken by the lever device 130, whereas in the apparatus shown in FIG. 13, an annular operation plate 150 mounted on the bottom surface of the hopper 50 is moved vertically to shake the parts W. The apparatus 13 shown in FIG. 11 has also an effect similar to that shown in FIG. 1.

Figure 14:
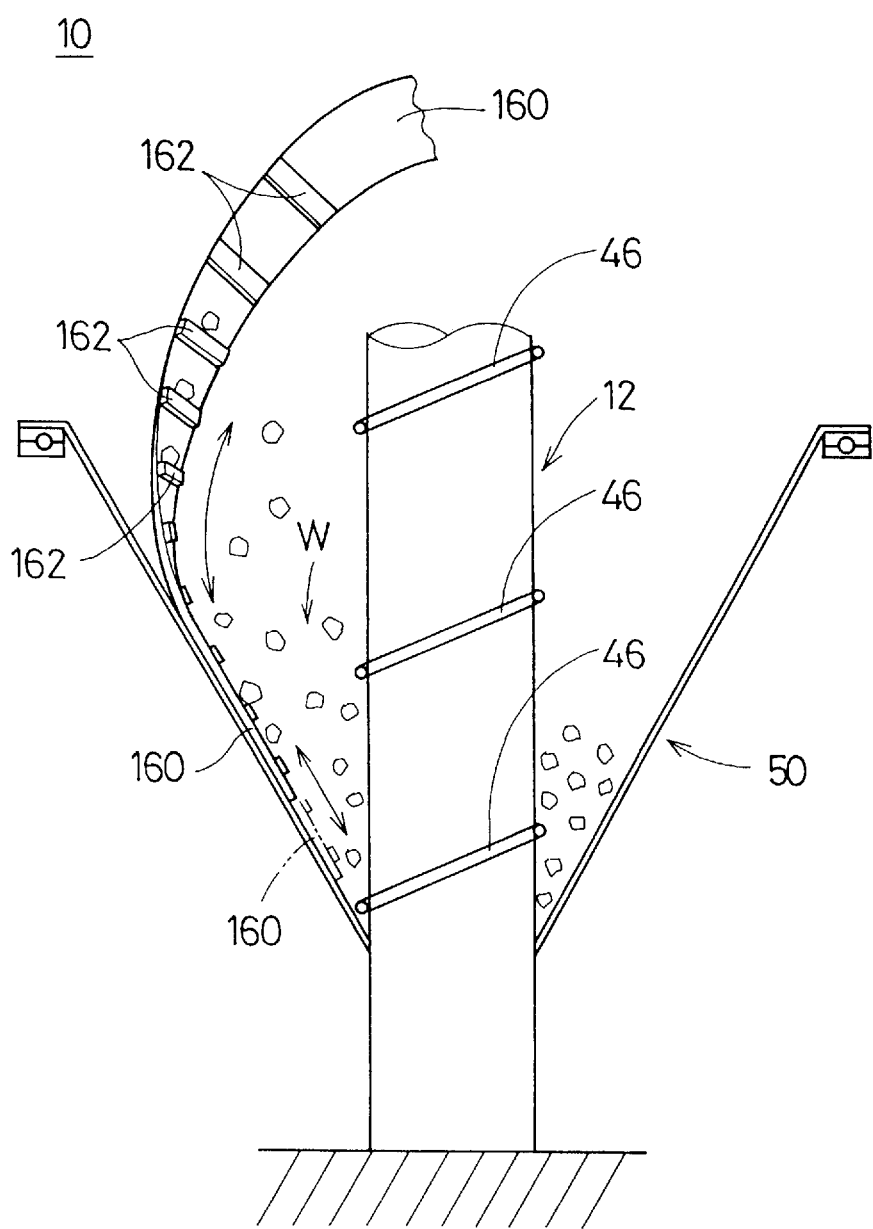
FIG. 14 is a main portion-depicted front view schematically showing a transport apparatus according to an embodiment of the present invention.

FIG. 14 is a main portion-depicted front view schematically showing a transport apparatus according to an embodiment of the present invention. In the apparatus shown in FIG. 14, unlike those shown in FIGS. 11 through 13, a belt-shaped shaking member 160 is moved along the inner peripheral surface of the hopper 50 to shake the parts W. The shaking member 160 has a plurality of projections 162 trapezoidal in section and spaced at predetermined intervals in the lengthwise direction of the shaking member 160. In the apparatus shown in FIG. 14, when the shaking member 160 is moved, the parts W are effectively stirred by the projections 162.

Figure 15:
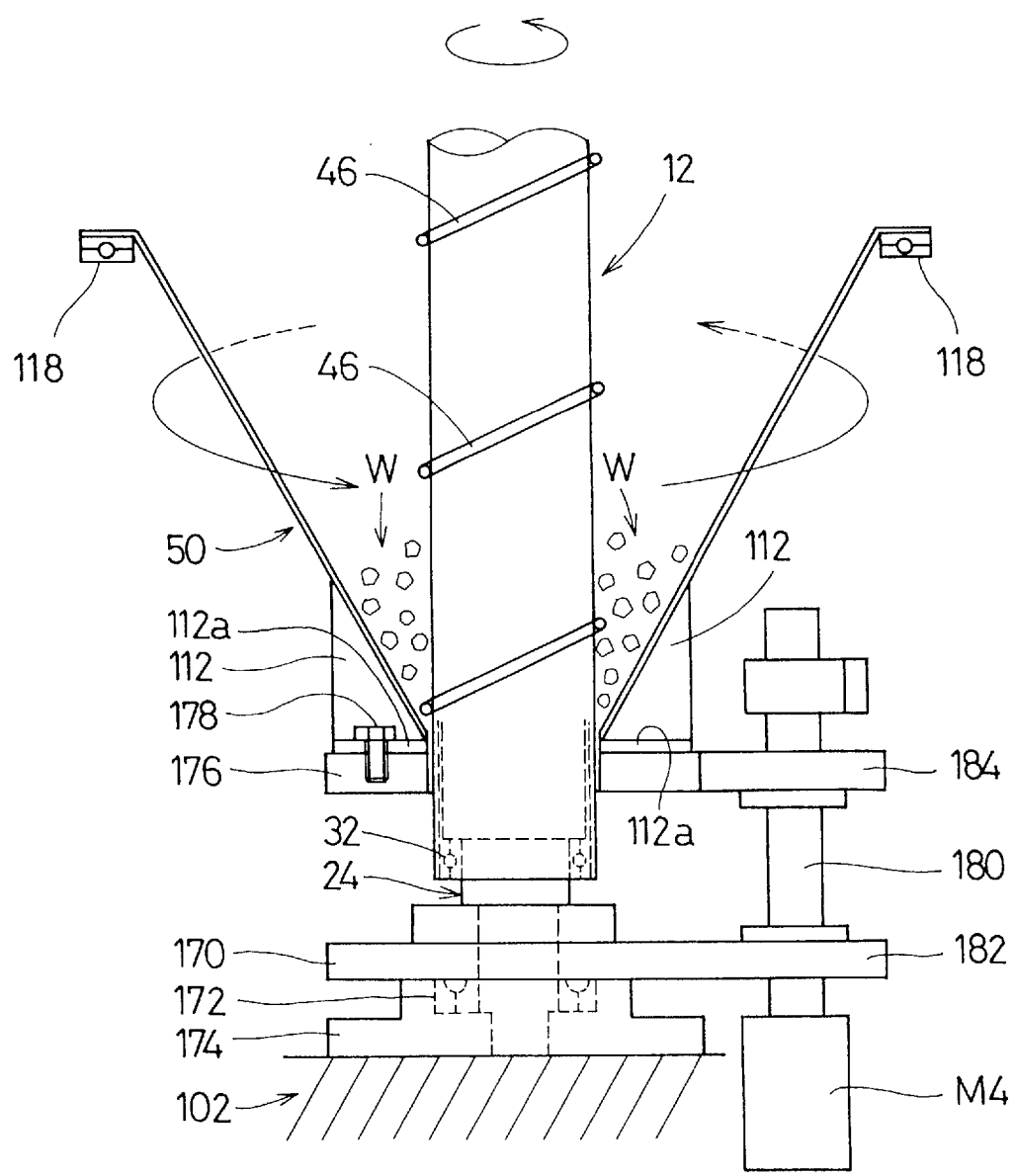
FIG. 15 is a main portion-depicted front view schematically showing a transport apparatus according to an embodiment of the present invention.

FIG. 15 is a main portion-depicted front view schematically showing a transport apparatus according to an embodiment of the present invention. In the apparatus shown in FIG. 15, unlike that shown in FIG. 1, the rotary shaft 24 and the hopper 50 are rotated by the same rotation-driving means. In the apparatus shown in FIG. 15, the rotary shaft 24 projects downward from the lower end of the transport member 12 in the axial direction of the transport member 12. A gear 170 for rotating the rotary shaft 24 is provided at the lower end of the rotary shaft 24 in the axial direction of the rotary shaft 24. The gear 170 is rotatably supported by a flange 174 through a bearing 172. The flange 174 is fixed to the frame body 102 at a lower portion of the frame body 102.

A gear 176 for rotating the hopper 50 is rotatably provided on the transport member 12 at a position proximate to the bottom of the hopper 50. A disc-shaped plane connection member 112a is fixed to the gear 176 by a fixing means such as a bolt 178. The plane connection member 112a is fixed to the lower end of a connection strip 112 by welding or the like. A motor M4 for driving the rotary shaft 24 and the hopper 50 is mounted on the frame body 102 at a lower portion thereof. The driving shaft of the motor M4 is connected with a transmission shaft 180. Gears 182 and 184 are mounted on the transmission shaft 180 by spacing them at a predetermined interval in the axial direction of the transmission shaft 180. The gears 182 and 184 engage the gears 174 and 176, respectively.

In the transport apparatus 10 shown in FIG. 15, when the motor M4 is driven, the driving force of the motor M4 is transmitted to the gears 170 and 176 through the gears 182 and 184, respectively. As a result, the rotary shaft 24 and the hopper 50 are rotated in the same direction. That is, the motor M4 rotates the rotary shaft 24 and the hopper 50 in the same direction. It is possible to replace the gears 170, 176, 182, and 184 for rotating the rotary shaft 24 and the hopper 50 with pulleys and transmit the rotational force of the motor M4 transmitted from the transmission shaft 180 to the pulleys.

Figure 16:
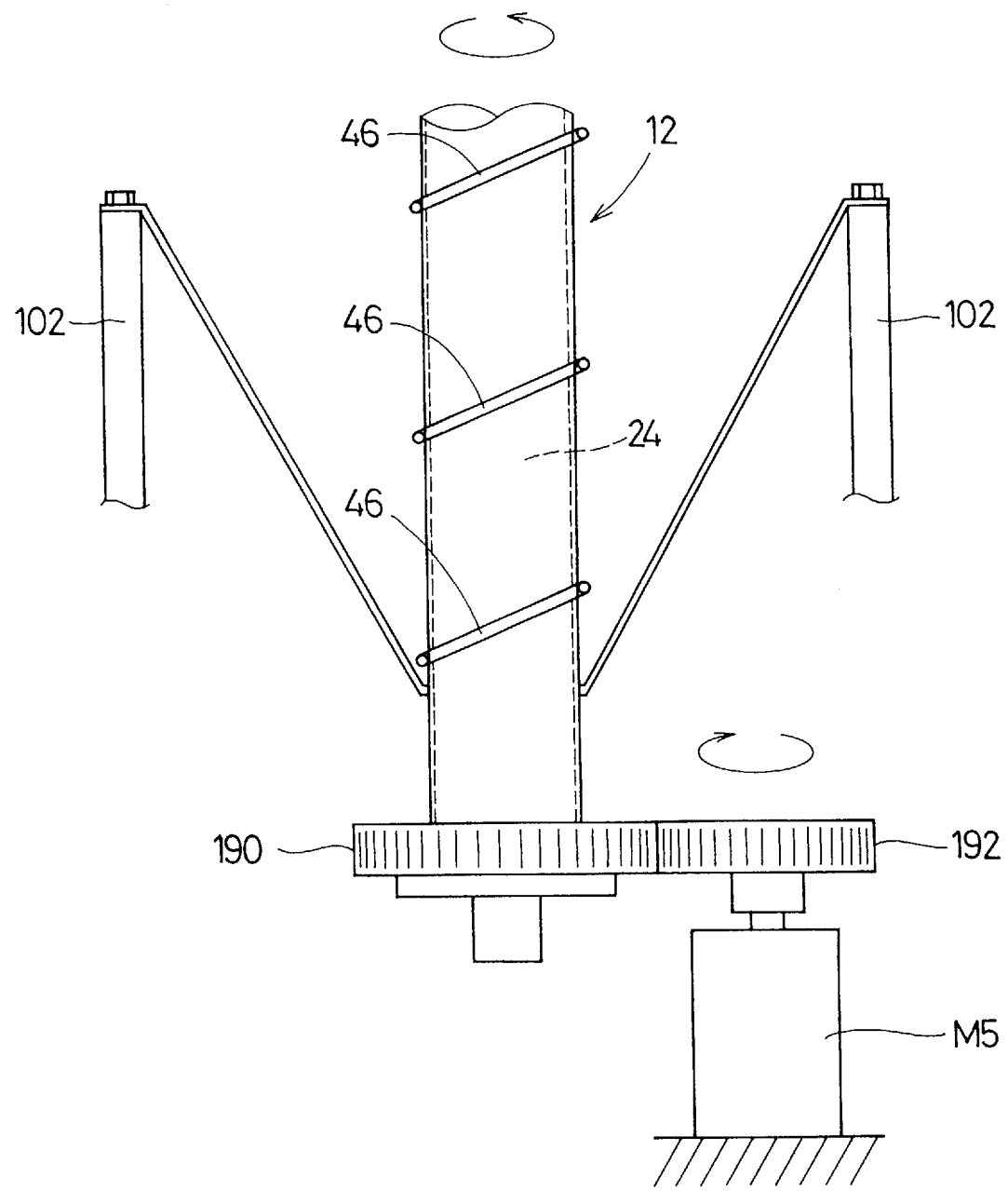
FIG. 16 is a main portion-depicted front view schematically showing a transport apparatus according to an embodiment of the present invention.

FIG. 16 is a main portion-depicted front view schematically showing a transport apparatus according to an embodiment of the present invention. In the transport apparatus 10 shown in FIG. 16, unlike that shown in FIG. 1, the hopper 50 is not rotated, but the transport member 12 and the supporting guide 46 are rotated. In the transport apparatus 10 shown in FIG. 16, the hopper 50 is nonrotatably fixed to the frame body 102. A gear 190 for rotating the transport member 12 is provided at the lower end of the transport member 12 in the axial direction of the transport member 12. A motor M5 for rotating the transport member 12 is mounted on the frame body 102 at a lower portion of the frame body 102. A gear 192 mounted on the driving shaft of the motor M5 engages the gear 190. Thus, when the motor M5 is driven, the rotational force of the motor M5 is transmitted to the gear 190 through the gear 192. That is, the transport member 12 rotates together with the supporting guide 46. In the transport apparatus 10 shown in FIG. 16, by rotating the transport member 12 and the supporting guide 46, the parts W supplied from the hopper 50 to the transport member 12 are stirred and transported upward along the progress direction, namely, the lead angle direction of the supporting guide 46. Thus, in the transport apparatus 10 shown in FIG. 16, the parts W can be prevented from being bridged with each other.

Figure 17:
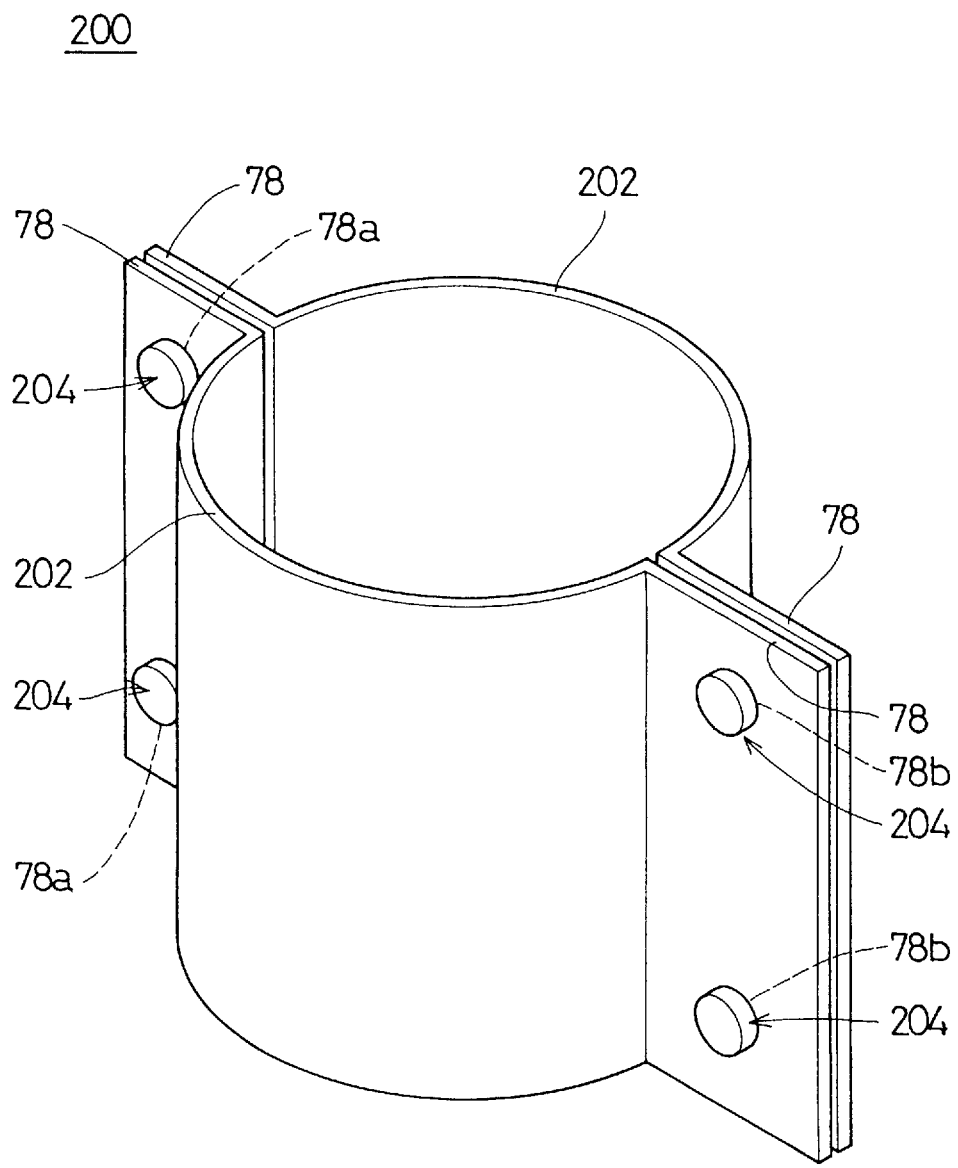
FIG. 17 is a perspective view showing a modification of the sandwiching member shown in FIGS. 1, 7, and 8.
Figure 18:
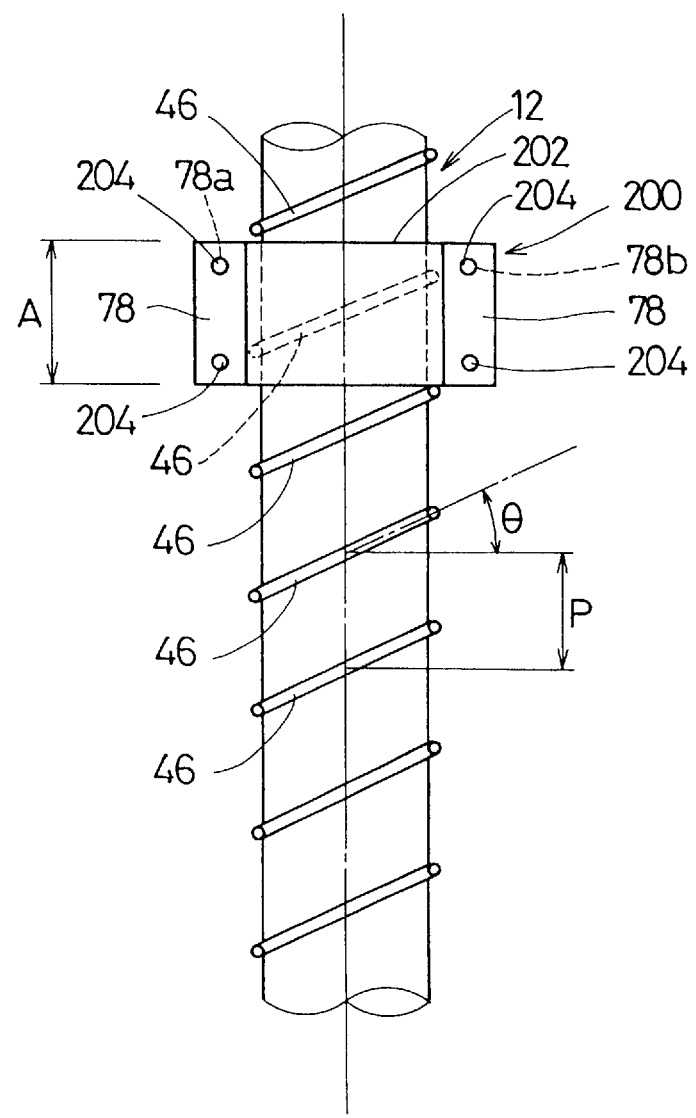
FIG. 18 is a main portion-depicted front view showing a state in which the sandwiching member shown in FIG. 17 is mounted on a transport path.

FIG. 17 is a perspective view showing a modification of the sandwiching member shown in FIGS. 1, 7, and 8. FIG. 18 is a main portion-depicted front view showing a state in which the sandwiching member shown in FIG. 17 is mounted on a transport path.

In a pair of sandwiching members 200 shown in FIG. 17, grooves and contact portion which contacts the peripheral surface of the transport member 12 are not formed on the inner peripheral surface of a sandwiching portion, unlike the sandwiching member 72 shown in FIGS. 7 and 8. That is, a pair of sandwiching portions 202 of the sandwiching member 200 shown in FIG. 17 forms a cylindrical configuration. Referring to FIG. 18, if the length A of the sandwiching portion 202 in its axial direction is greater than the pitch P of the supporting guide 46, the inner peripheral surface of the sandwiching portion 202 contacts the supporting guide 46 in an area corresponding to one pitch or more. Thus, a pair of the sandwiching members 200 can be mounted on the transport member 12 reliably.

FIGS. FIGS. 19(A), 19(B), and 19(C) are main portion-depicted front views showing modifications of supporting guides to be mounted on the transport apparatuses of the above-described embodiments.

The supporting guide 46 to be applied to the transport apparatuses of the above-described embodiments is circular in section, whereas the supporting guide 46 of this embodiment can be formed in various shapes. For example, the supporting guide 46 may be rectangular or L-shaped in section as shown in FIG. 19(A) and 19(B), respectively. In the supporting guide 46 shown in FIG. 19(B), the shorter side 46a of the supporting guide 46 has a function of preventing the parts W from being dropped from the supporting guide 46. Further, as shown in FIG. 19(C), the longer side 46b, of the supporting guide 46, approximately L-shaped in section is upwardly oblique with respect to the peripheral surface of the transport member 12.

FIGS. 20(A), 20(B), and 20(C) are main portion-depicted front views showing modifications of rotary yokes to be applied to the transport apparatuses of the above-described embodiments.

The magnetic force generation portion 38 of the rotary yoke 22 of the transport member 12 to be applied to the transport apparatuses of the above-described embodiments is formed straight in only one row along the axial direction of the rotary shaft 24, whereas in this embodiment, the magnetic force generation portions 38 is formed in a plurality of rows at regular intervals in the circumferential direction of the rotary shaft 24, as shown in FIGS. 20(A), 20(B), and 20(C). According to the inventors' experiments, it has been found that the magnetizing force of the magnetic force generation portion 38 is most intense when the magnetic force generation portions 38 are arranged in such a manner that the opposed magnetic force generation portions 38 bisect the circumference of the rotary shaft 24, respectively.

In the transport member 12 to be applied to the transport apparatus of each of the above-described embodiments, the rotary shaft 24 is cylindrical, but may be appropriately varied. For example, the rotary shaft 24 may be square or hexagonal in section, as shown in FIG. 20(B) and FIG. 20(C), respectively.

In each of the above-described embodiments, the transport member 12 is stationary, while the rotary yoke 22 provided with the magnetic force generation portions 38 is rotated to allow the parts W to be magnetically attracted to the peripheral surface of the transport member 12 so as to transport them in the axial direction of the transport member 12 along the supporting guide 46. But instead, it is possible to rotate the transport member 12 and make the rotary yoke 22 stationary to transport the parts W in the axial direction of the transport member 12 along the supporting guide 46.

In each of the above-described embodiments, the hopper 50 is funnel-shaped, namely, conic, but may be formed in various shapes. For example, the hopper 50 may be cylindrical, elliptical-tic cylindrical, six-sided pyramidal, hexagonal pyramidal or polygonal pyramidal.

Figure 21:
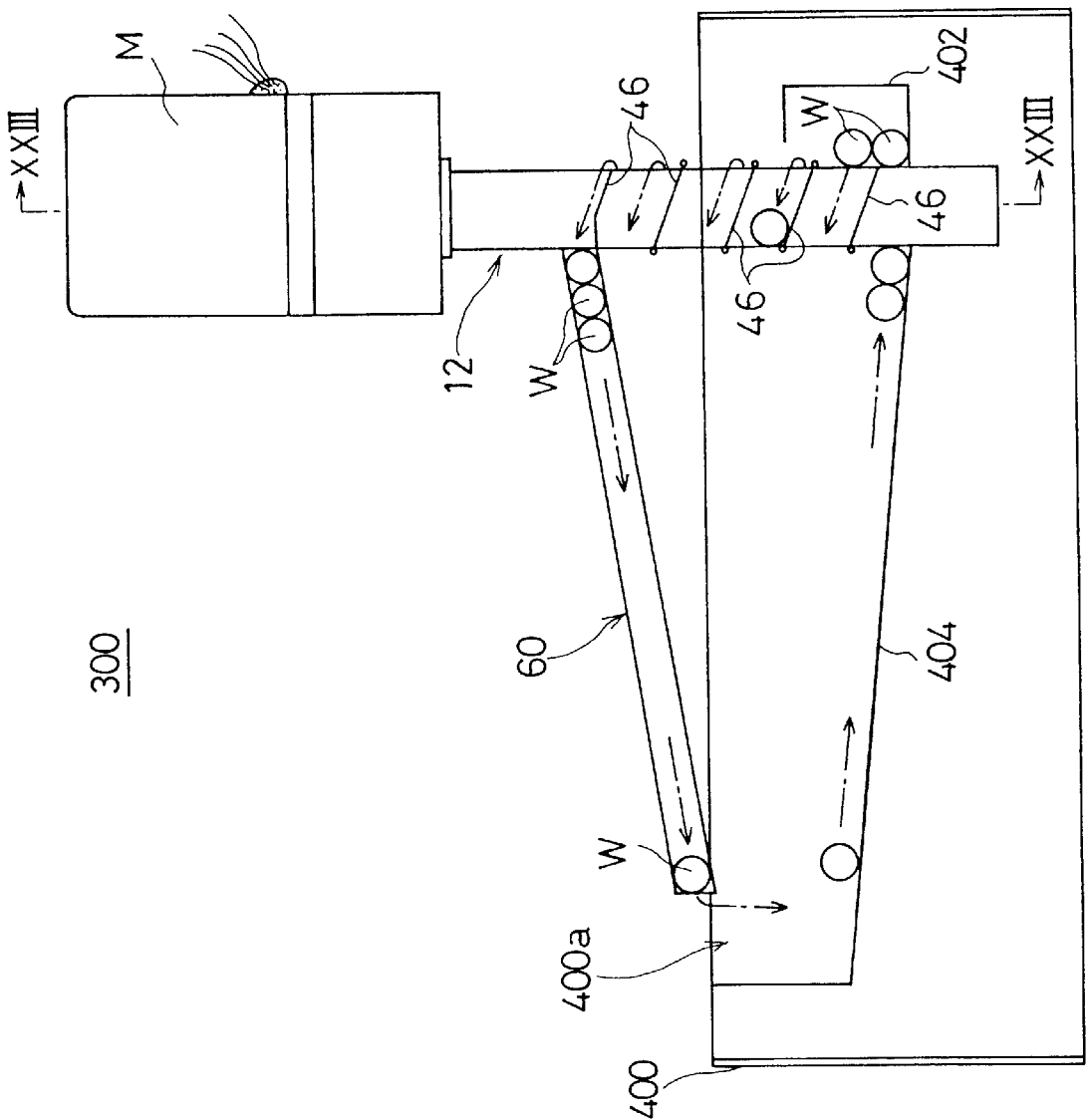
FIG. 21 is a front view showing a transport apparatus according to an embodiment of the present invention.
Figure 22:
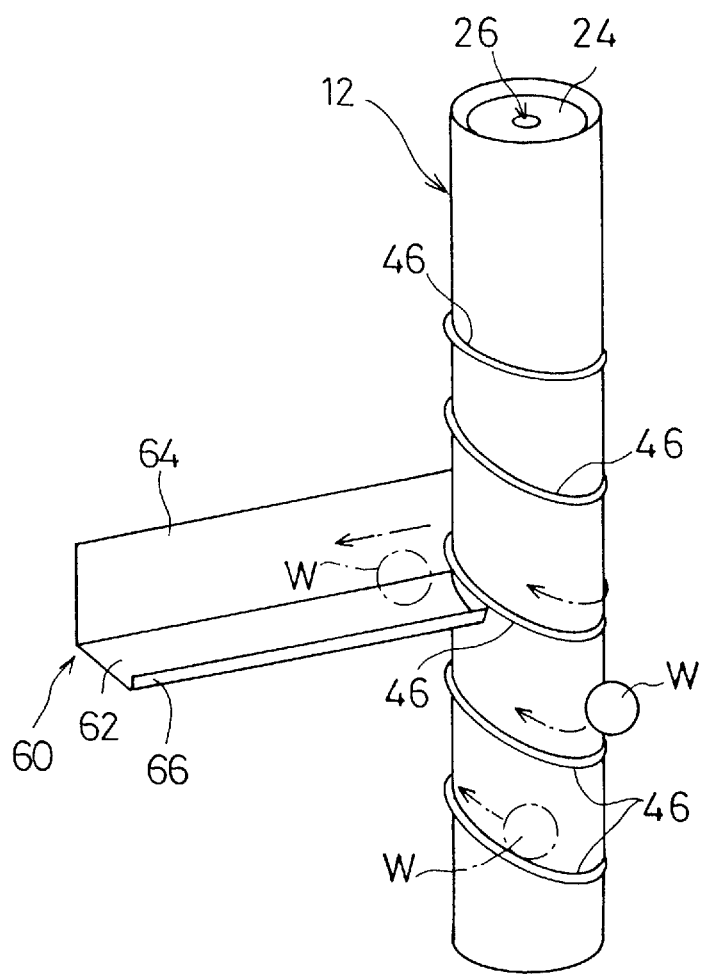
FIG. 22 is a perspective view showing main portions of the transport apparatus shown in FIG. 21.
Figure 23:
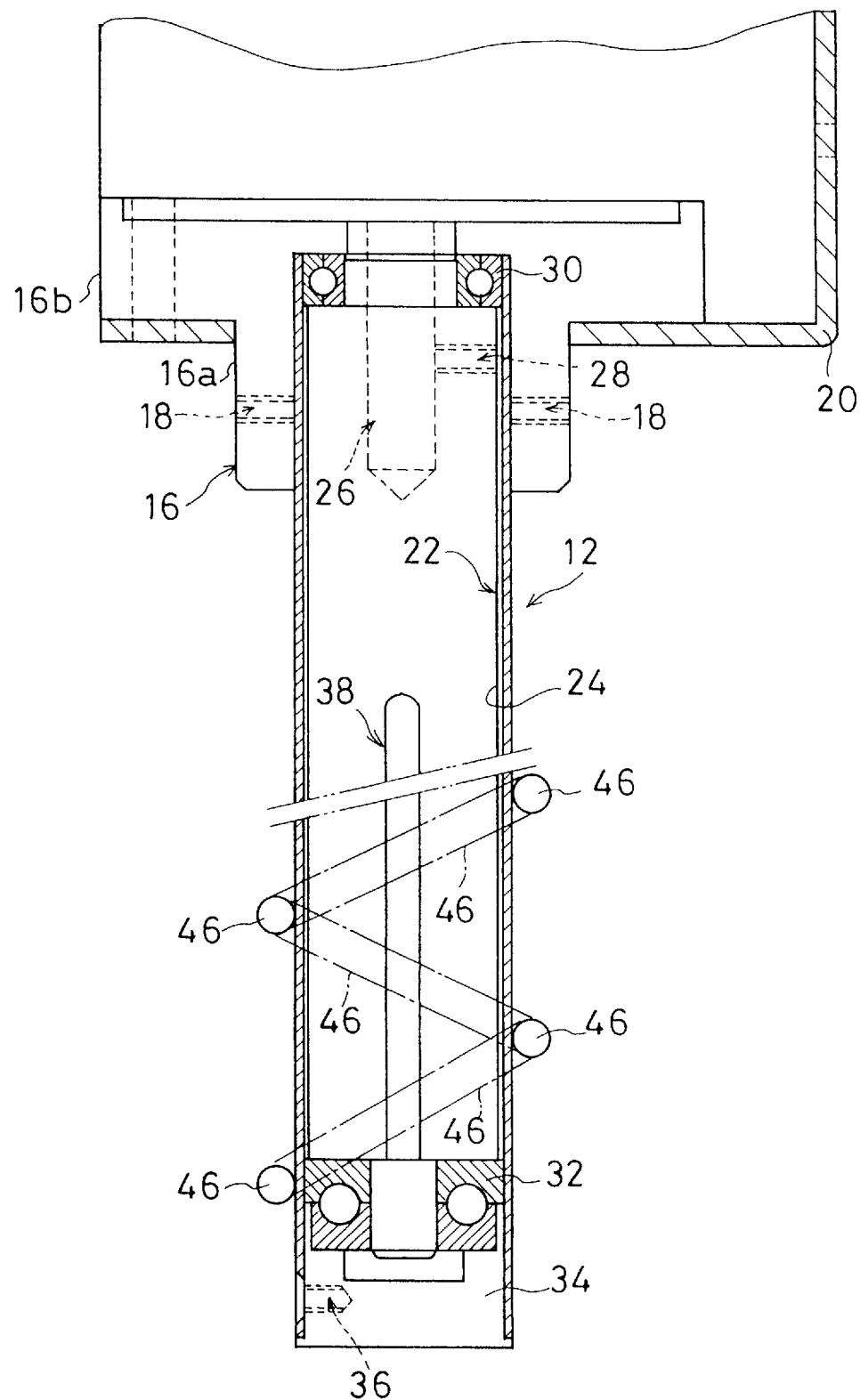
FIG. 23 is a main portion-depicted sectional view, showing the transport apparatus shown in FIG. 21, taken along a line XXIII—XXIII of FIG. 21.

In each of the above-described embodiments, the parts W being transported in the axial direction of the transport member 12 is transferred to desired places through the transfer path 60. Instead, the parts W may be transferred to a supply portion 402 again by means of the transfer path 60 as shown in FIGS. 21 through 23. That is, in a transport apparatus 300 according to an embodiment of the present invention, the parts W such as steel balls are circulated through the transfer path 60, unlike the embodiment shown in FIG. 1.

That is, as shown in FIG. 21, in the transport apparatus 300, the transport member 12 is removably installed in a case 400 having an open portion 400a formed at the upper side of the case 400. The supply portion 402 for supplying the parts W such as steel balls to the lower end of the transport member 12 in its axial direction is formed at one side of the case 400 in its longitudinal direction. Further, a receiving member 404 extending from an upper portion of the case 400 at the other side in its longitudinal direction to the lower end of the transport member 12 is mounted in the case 400. In the transport apparatus 300, the parts W are supplied to the supply portion 402 and transported upwardly vertically by the transport member 12. The parts W being transported upward along the supporting guide 46 is brought into contact with the guide plate 64 of the transfer path 60 and moves along the transfer plate 62 under the guidance of the guide plate 64. The parts W being guided to the transfer path 60 drop to the receiving member 404 inside the case 400 and are supplied to the supply portion 402 again.

Figure 24C:
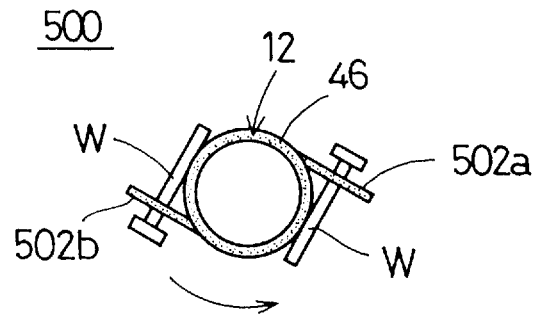
FIG. 24(C) is a main portion-depicted plan view showing the transport apparatus shown in FIG. 24(A).
Figure 24A:
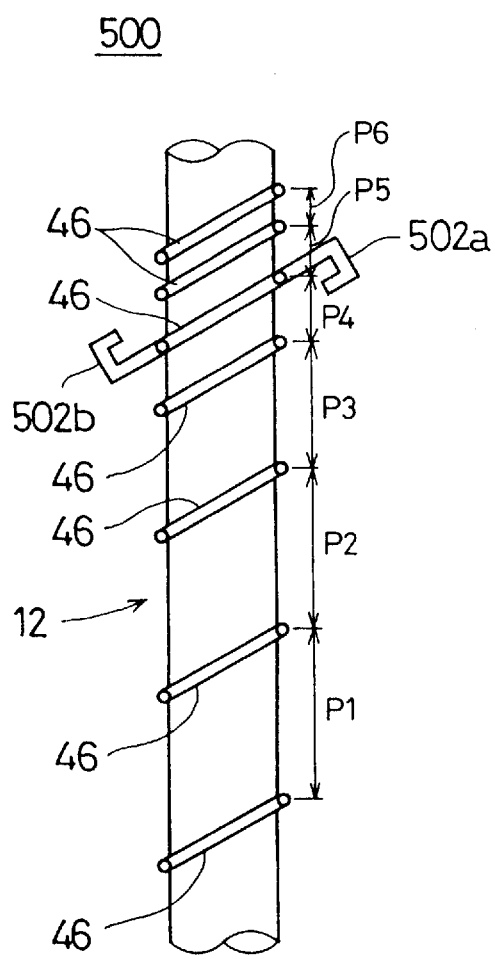
FIG. 24(A) is a main portion-depicted front view showing a transport apparatus having a parts-arranging function.
Figure 24B:
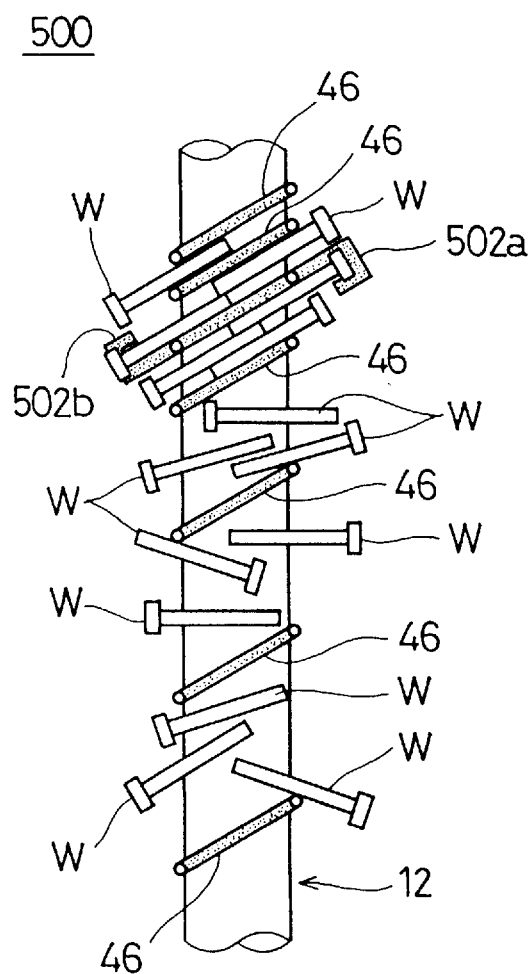
FIG. 24(B) is a main portion-depicted front view showing the operation of the parts-arranging function of the transport apparatus shown in FIG. 24(A).

FIG. 24(A) is a main portion-depicted front view showing a transport apparatus having a parts-arranging function. FIG. 24(B) is a main portion-depicted front view showing the operation of the parts-arranging function of the transport apparatus. FIG. 24(C) is a main portion-depicted plan view showing the transport apparatus shown in FIG. 24(A).

Unlike the transport apparatuses 10 and 300 of the above-described embodiments, a transport apparatus 500 of this embodiment has a function of transporting parts W by arranging them in a predetermined posture. In the transport apparatus 500, as shown in FIG. 24(A), the intervals between adjacent portions of the supporting guide 46 are set such that the lower one is greater than the upper one in the axial direction of the transport member 12. More specifically, P1>P2>P3>P4>P5>P6. The transport apparatus 500 of this embodiment transports bolts W as the object of transporting. The shortest distance between the uppermost and second uppermost portion of the supporting guide 46 having the shortest interval P6 is slightly greater than the diameter of the shank of the bolt W.

L-shaped drop guides 502a and 502b are mounted on the lower portion of the two portions, of the supporting guide 46, having the interval P5. As shown in FIG. 24(C), the drop guides 502a and 502b are positioned symmetrically with respect to a diameter of the transport member 12. The drop guides 502a and 502b are fixed to the supporting guide 46 by welding, bonding or screw such that the front end of the drop guide 502a faces downward and the front end of the drop guide 502b faces upward.

As shown in FIG. 24(B), in the transport apparatus 500, the posture of the bolt W approaches the predetermined posture as the bolt W moves upward along the supporting guide 46 because the width of the interval between two adjacent portions of the supporting guide 46 becomes smaller. Finally, the posture of the bolt W becomes the predetermined posture when it is positioned between the adjacent portions, of the supporting guide 46, the interval of which is P6. Even though the bolts W are transported with the bolts W being magnetically attracted to each other, the bolts W in postures other than the predetermined posture are brought into contact with the drop guides 502a and 502b and dropped, thus being transferred between the two adjacent portions, of the supporting guide 46, having the interval P6 therebetween. In this manner, the bolts W being transported with the bolts W magnetically attracted to the peripheral surface of the transport member 12 in various postures are sequentially arranged in the predetermined posture.

Figure 25C:
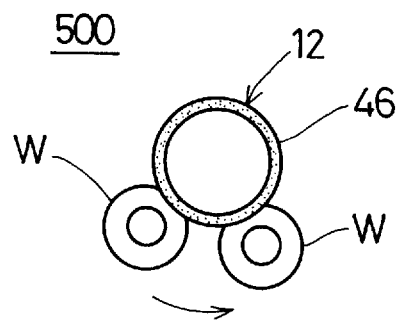
FIG. 25(C) is a main portion-depicted plan view showing the transport apparatus shown in FIGS. 25(A) and 25(B).
Figure 25A:
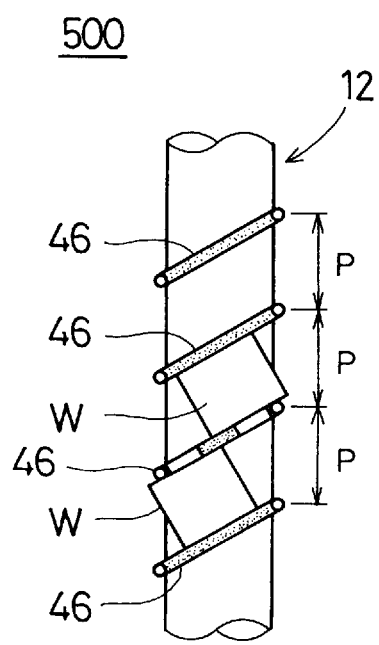
FIGS. 25(A) and 25(B) are main portion-depicted front views showing a transport apparatus having another parts-arranging function and the operation thereof.
Figure 25B:
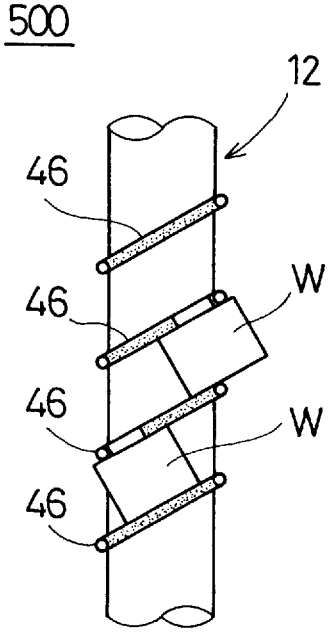

FIGS. 25(A) and 25(B) are main portion-depicted front views showing a transport apparatus having another parts-arranging function and the operation thereof. FIG. 25(C) is a main portion-depicted plan view showing the transport apparatus shown in FIGS. 25(A) and 25(B). Unlike the transport apparatus 500 shown in FIGS. 24(A) through 24(C), a transport apparatus 500 of this embodiment has the supporting guide 46 wound on the peripheral surface of the transport member 12 at regular intervals P. The transport apparatus 500 of this embodiment ztransports caps W as the object of transporting. The shortest distance between two adjacent portions of the supporting guide 46 is set to be a little greater than the height of the height of each cap W. Therefore, the caps W are sequentially arranged in the predetermined posture between the two adjacent portions of the supporting guide 46 while they are being transported, with the caps W sandwiched between the two adjacent portions of the supporting guide 46.

Figure 26A:
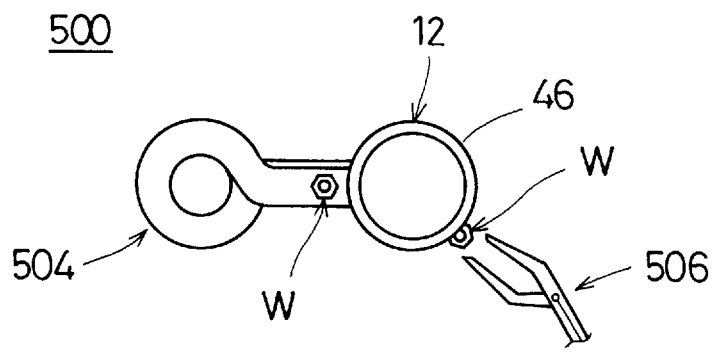
FIG. 26(A) is a main portion-depicted plan view showing a transport apparatus having still another parts-arranging function and its function.
Figure 26B:
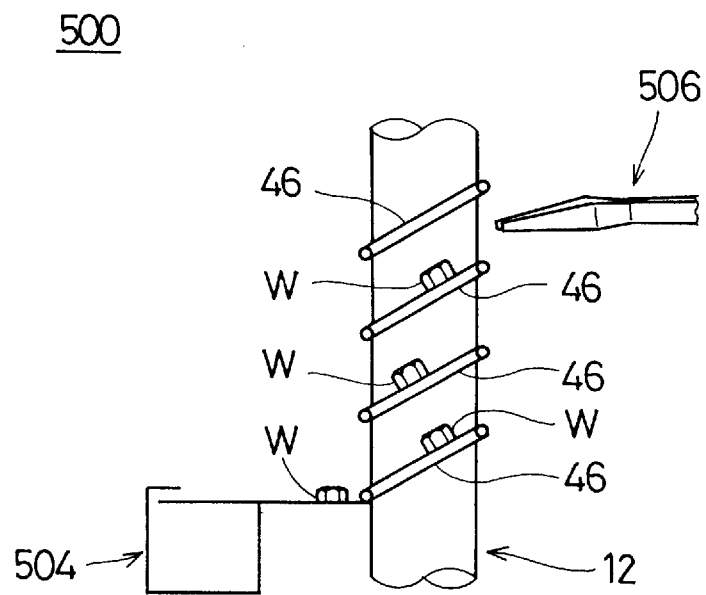
FIG. 26(B) is a main portion-depicted front view showing the transport apparatus shown in FIG. 26(A).

FIG. 26(A) is a main portion-depicted plan view showing a transport apparatus having still another parts-arranging function and its function. FIG. 26(B) is a main portion-depicted front view showing the transport apparatus shown in FIG. 26(A).

In a transport apparatus 500 of this embodiment, different from that shown in FIGS. 24(A) through 24(C) and that shown in FIGS. 25(A) and 25(B), parts W are supplied to the transport member 12 one by one by adjusting them previously to be in a predetermined posture. In this embodiment, the transport apparatus 500 transports nuts W as the object of transporting. The transport apparatus 500 has a parts supply device 504 positioned alongside the transport member 12 and at a position corresponding to a lower level of the transport member 12. The parts supply device 504 arranges a plurality of the nuts W previously in the predetermined posture, thus supplying them to the transport member 12 one by one. In the transport apparatus 500, the nuts W sequentially fed out from the parts supply device 504 to the transport member 12 are transported toward the upper end of the transport member 12, with the nuts W arranged in order and in the predetermined posture. When the nuts W have arrived at a predetermined upper position of the transport member 12, they are taken out from the transport member 12 by an automatic take-out device 506 one by one to feed them to a subsequent process.

Figure 27A:
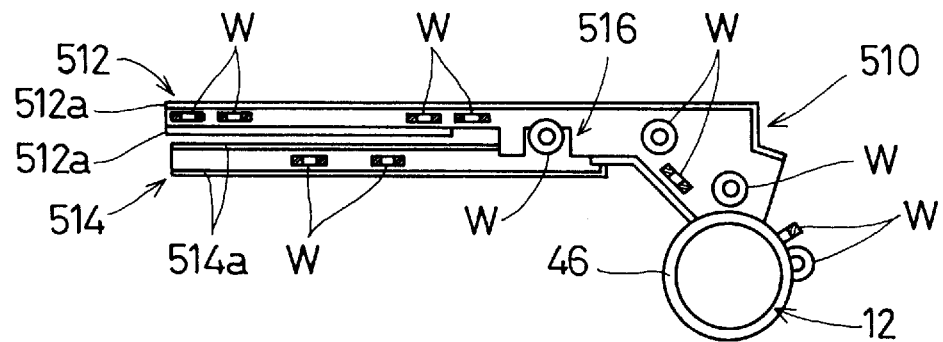
FIG. 27(A) is a main portion-depicted plan view showing a transport apparatus having still another parts-arranging function and its operation.
Figure 27B:
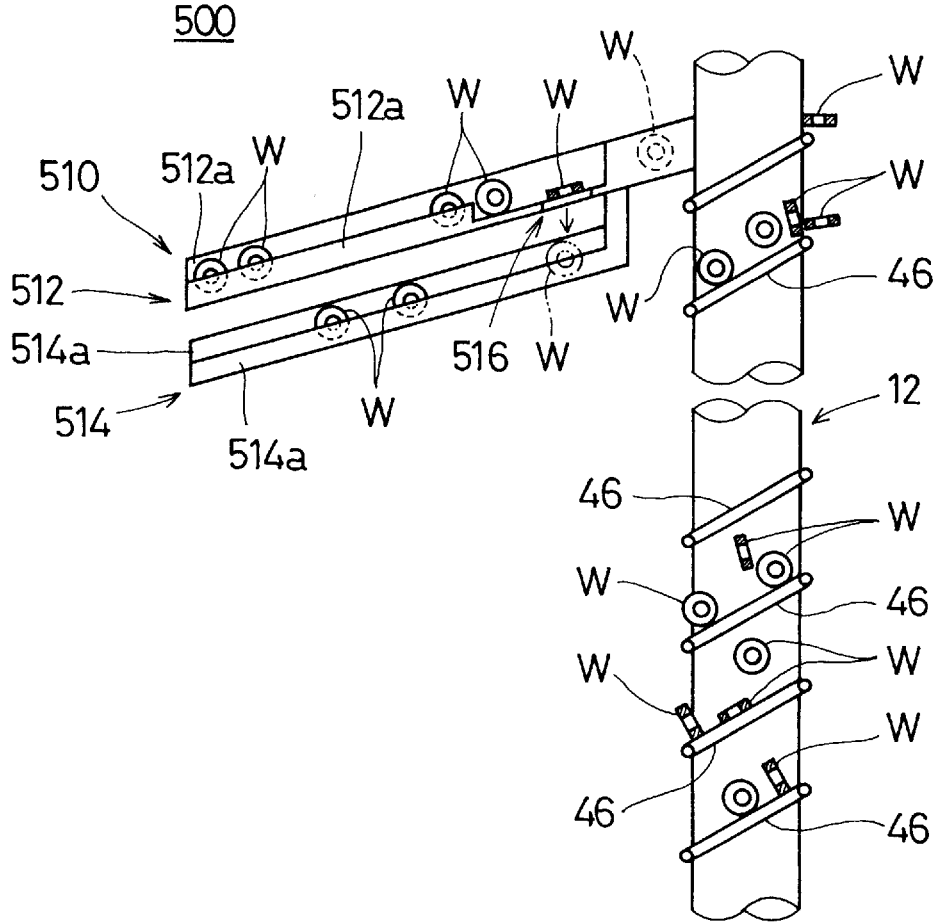
FIG. 27(B) is a main portion-depicted front view showing the transport apparatus shown in FIG. 27(A).

FIG. 27(A) is a main portion-depicted plan view showing a transport apparatus having still another parts-arranging function and its operation. FIG. 27(B) is a main portion-depicted front view showing the transport apparatus shown in FIG. 27(A).

In a transport apparatus 500 of this embodiment, different from that shown in FIGS. 24(A) through 24(C), that shown in FIGS. 25(A) and 25(B), and that shown in FIGS. 26(A) and 26(B), parts W are arranged in a predetermined posture and in order at a take-out position of the transport member 12. The transport apparatus 500 of this embodiment transports rings W as the object of transporting. The transport apparatus 500 has an arranging device 510 having a function of arranging the rings W in order. The arranging device 510 is located at a position proximate to the take-out position located at an upper portion of the transport member 12. The arranging device 510 comprises a first arranging path 512 and a second arranging path 514 located below the first arranging path 512. In order to arrange the rings W in an erected posture, guide plates 512a, 512a and guide plates 514a, 514a are vertically formed at both sides of each of the first arranging path 512 and the second arranging path 514. The width of each of the first arranging path 512 and the second arranging path 514 is set to be slightly larger than the thickness of each ring W.

A shooter 516 movable in response to electric signals outputted from a sensor (not shown) in FIG. 27 is provided at the upstream side of the first arranging path 512. The shooter 516 can be inclined by a cylinder, a cam or a solenoid.

In the arranging device 510, if the rings W are in an unerected posture on the shooter 516, the sensor detects it, thus outputting a signal to the shooter 516 to actuate it. As a result, the shooter 516 inclines toward the second arranging path 514, thus dropping the rings W on the shooter 516 from the first arranging path 512 to the second arranging path 514. The rings W dropped to the second arranging path 514 are guided by the guide plates 514a and 514a and discharged from the arranging device 510 to a subsequent process, with the rings W standing erectly. The rings W which have passed through the shooter 516 in erected postures are guided by the guide plates 512a and 512a of the first arranging path 512; thus, they are sequentially discharged in erected postures from the arranging device 510 to the subsequent process.

Figure 28:
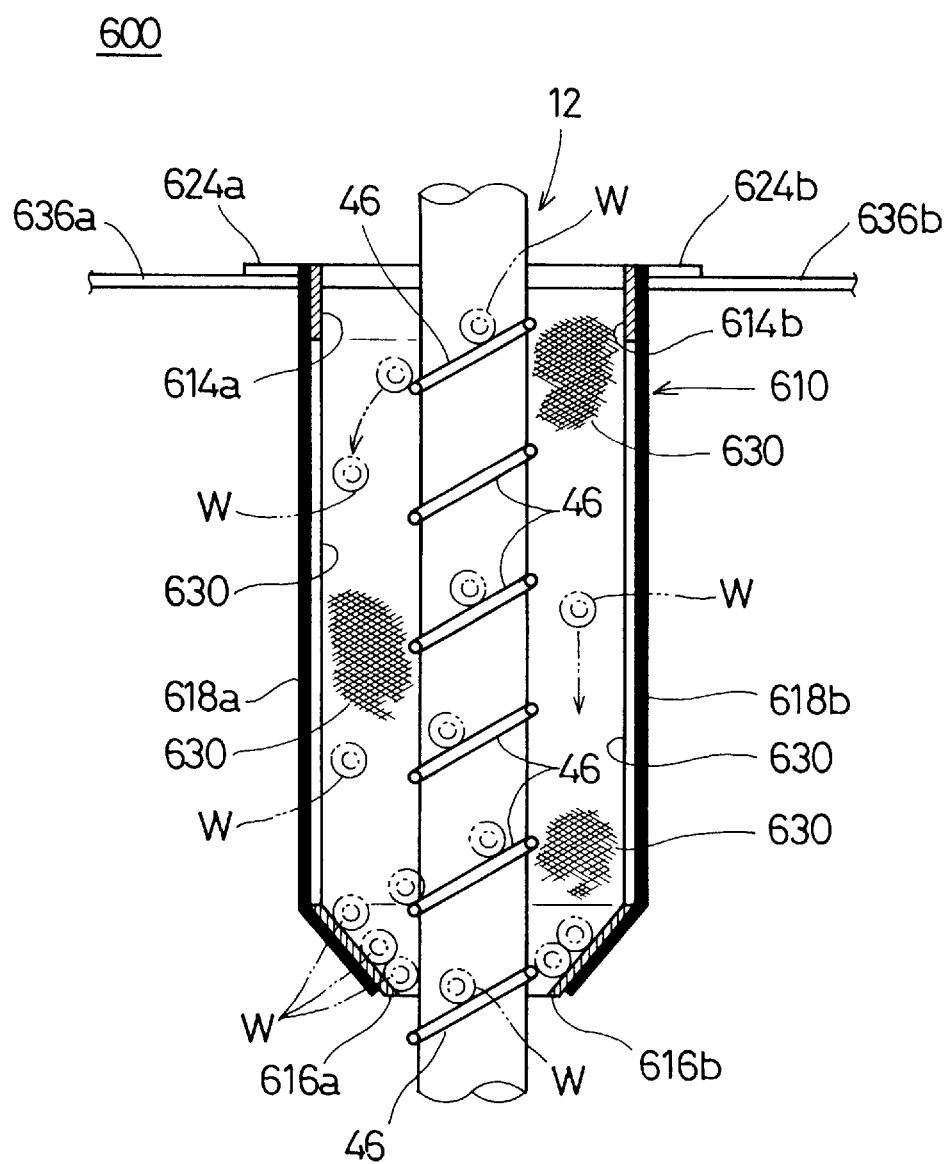
FIG. 28 is a main portion-depicted front view showing an example of a transport apparatus provided with a re-transport cover and having a parts-circulating function.

FIG. 28 is a main portion-depicted front view showing an example of a transport apparatus provided with a re-transport cover and having a parts-circulating function.

Unlike the transport apparatuses 10, 300, and 500 of the above-described embodiments, in a transport apparatus 600 of this embodiment, an approximately cylindrical re-transport cover 610 is provided in the periphery of the transport member 12 in a range proximate to its upper and lower end in the axial direction of the transport member 12. In the transport apparatus 600, as shown in FIG. 28, even if the parts W being transported along the supporting guide 46 drops from the transport member 12, the parts W can again be supplied to the transport member 12 in cooperation of the re-transport cover 610 and the transport member 12 so as to transport them along the supporting guide 46.

Figure 29:
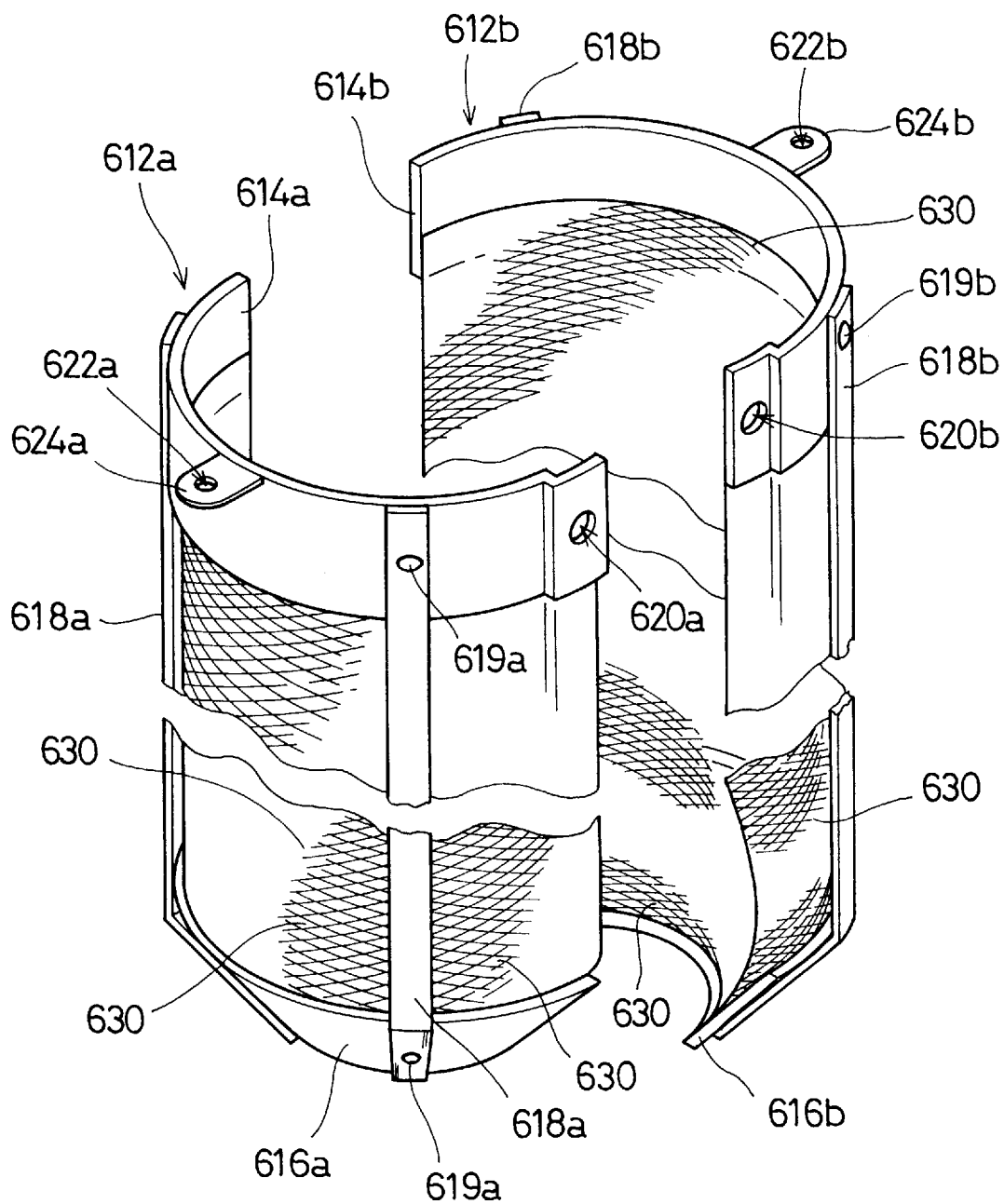
FIG. 29 is an exploded perspective view showing the re-transport cover of the transport apparatus shown in FIG. 28.

As shown in FIG. 29, the re-transport cover 610 comprises a pair of covers 612a and 612b having a double-split construction. Because the covers 612a and 612b have the same construction, only the construction of the cover 612a is described below. That is, the cover 612a comprises an upper ring member 614a having a semi-circular and annular configuration and a lower ring member 616a having a semi-conic and annular configuration. The upper ring member 614a and the lower ring member 616a are vertical and spaced at a predetermined interval and connected with each other by means of two approximately L-shaped joint stays 618a and 618a. The joint stays 618a and 618a are fixed to the upper ring member 614a and the lower ring member 616a with setscrews 619a, by spacing the joint stays 618a and 618a from each other at a predetermined interval in the circumferential direction of the upper ring member 614a and the lower ring member 616a.

The upper ring member 614a has a connection hole 620a for connecting a pair of the cover members 612a and 612b with each other at one end of the upper ring member 614a in the circumferential direction of the upper ring member 614a. A U-shaped mounting strip 624a having a hole 622a formed on the upper ring member 614a projects outward from the center of the upper ring member 614a in the circumferential direction of the upper ring member 614a. A metal net 630 curved in correspondence to the circular surface of the upper ring member 614a and the lower ring member 616a is fixed to the inner surface thereof by means of fixing means such as welding or the like.

Figure 30:
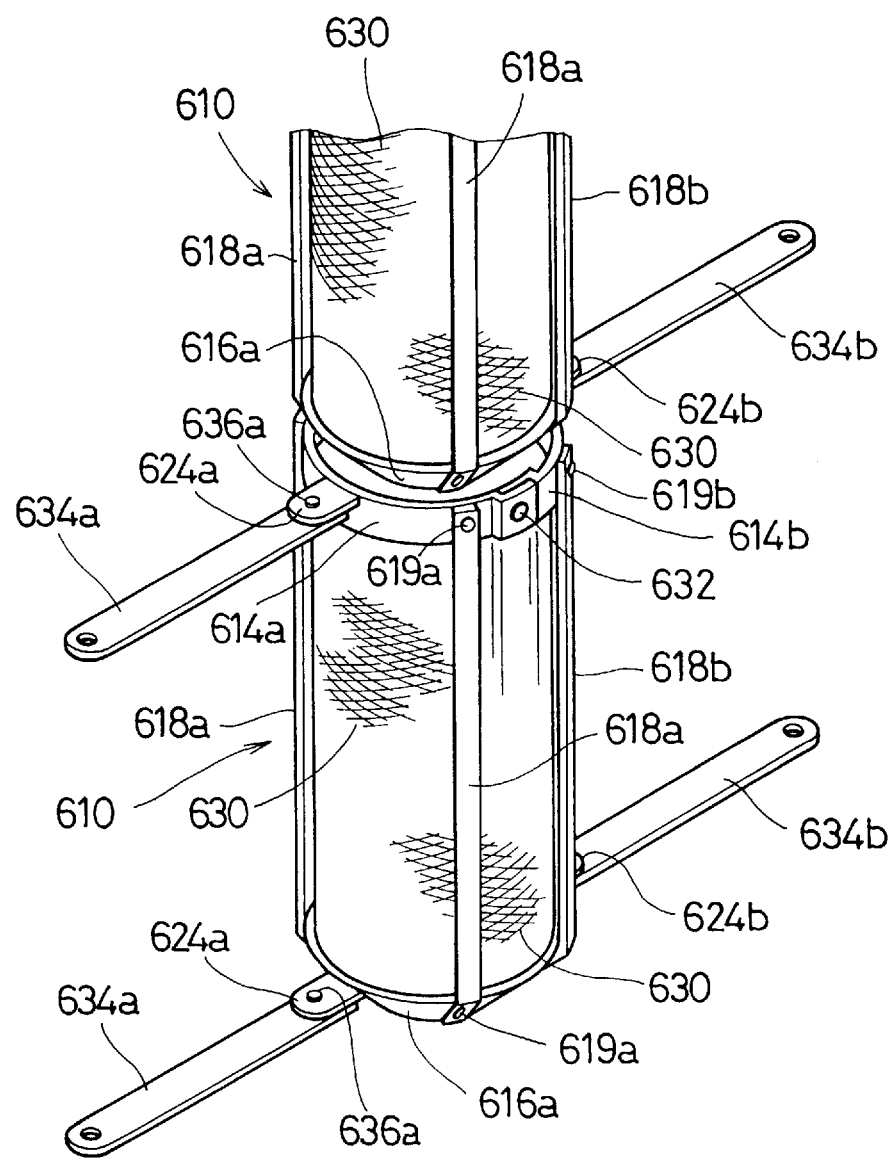
FIG. 30 is a main portion-depicted perspective view showing a state in which a plurality of the re-transport covers of the transport apparatus shown in FIG. 29 is vertically connected with each other.

As shown in FIG. 30, the cover members 612a and 612b are connected with each other by means of a setscrew 632 or the like by butting them with each other, with the connection hole 620a of the cover member 612a and the connection hole 620b of the cover member 612b coincident with each other. As shown in FIG. 28, the cover members 612a and 612b are connected with each other, with the transport member 12 surrounded therewith. As shown in FIG. 30, the cover members 612a and 612b are supported by long and narrow supporting stays 6334a and 634b, with the cover members 612a and 612b spaced at a predetermined interval from the transport member 12.

In this case, as shown in FIG. 28, the re-transport cover 610 is mounted in the periphery of the transport member 12 by spacing the cover members 612a and 612b at a predetermined interval from the supporting guide 46 in correspondence to the size of the parts W. One of each of the supporting stays 6334a and 634b is mounted on the mounting strip 624a of the upper ring member 614a and the mounting strip 624b of the upper ring member 614b with setscrews 636a and 636b, respectively, while the other end thereof is mounted on the frame member 103 (see FIG. 1) of the frame 100 supporting the transport member 600 with an appropriate fixing means.

In the transport apparatus 600, even if the parts W being transported along the supporting guide 46 drop from the transport member 12, the parts W are guided toward the transport member 12 along the inner peripheral surface of the lower ring members 616a and 616b of the re-transport cover 610. Consequently, the dropped parts W are transported upward along the supporting guide 46. Thus, the transport apparatus 600 prevents the parts W dropped from the transport member 12 from being scattered in the periphery thereof and mixed in apparatuses of different processes.

Figure 31:
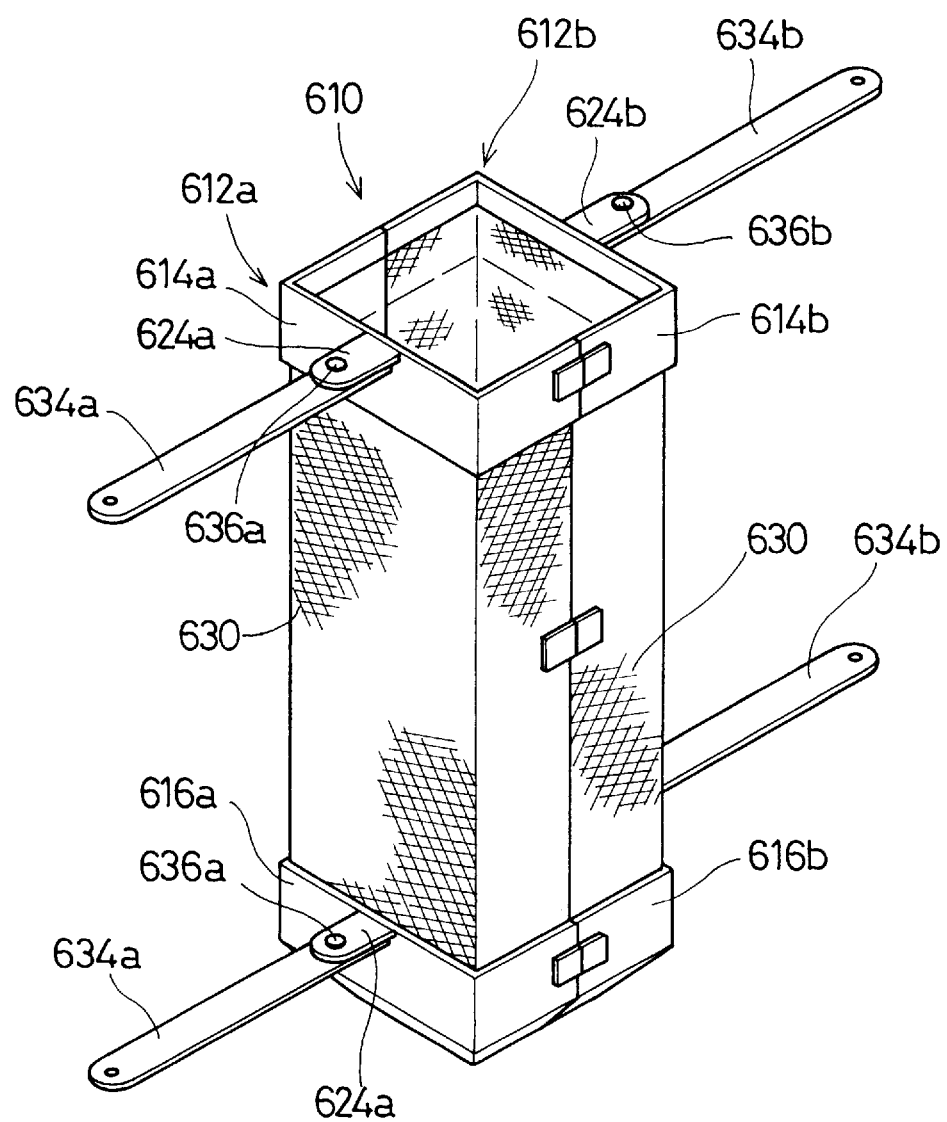
FIG. 31 is a perspective view showing another example of a re-transport cover.
Figure 32A:
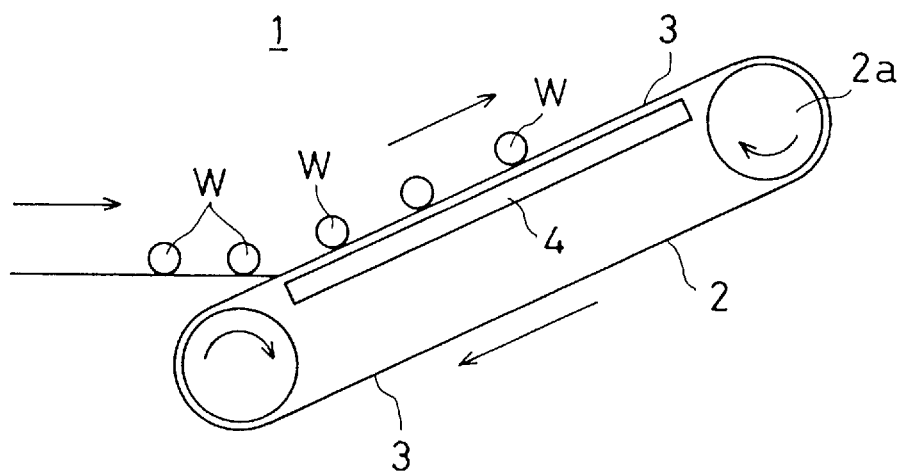
FIG. 32(A) is a schematic view showing an example of a conventional transport apparatus which forms the background of the present invention.
Figure 32B:
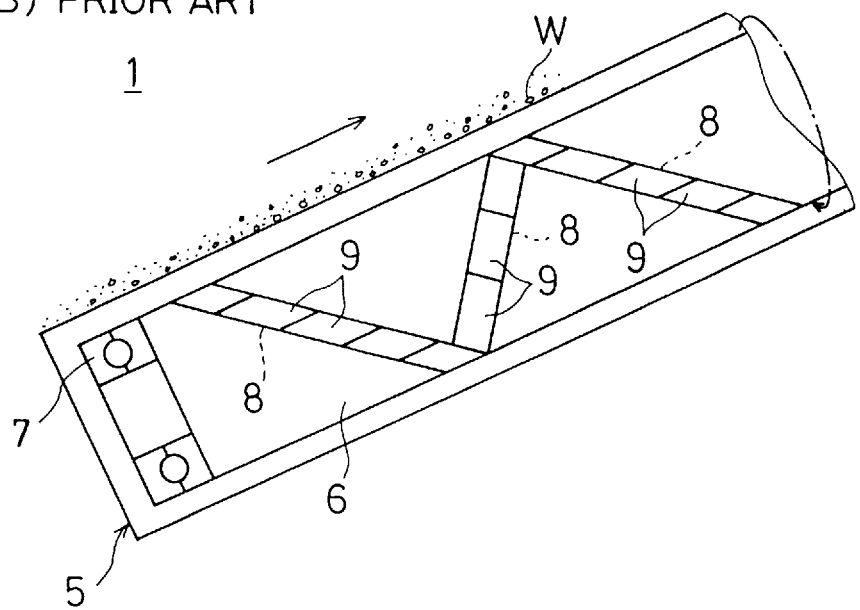
FIG. 32(B) is a schematic view showing another example of a conventional transport apparatus which forms the background of the present invention.

The height of the re-transport cover 610 is appropriately adjusted according to the length (height) of the transport member 12 in the axial direction of the transport member 12. As shown in FIG. 30, two or more re-transport covers 610 may be vertically provided depending on the height of the transport member 12. Further, the re-transport covers 610 are not limited to the approximately cylindrical configuration shown in FIGS. 28 through 30, but may be in any desired configurations, for example, rectangular cylindrical as shown in FIG. 31.

It will be apparent from the foregoing that, while the present invention has been described in detail and illustrated, these are only particular illustrations and examples and the present invention is not limited to these, the spirit and scope of the present invention being limited only by the appended claims.

What is claimed is:

1. A transport apparatus comprising:

a cylindrical transport member;

A cylindrical rotary member positioned inside the transport member;

a magnetic force generation portion provided on the rotary member in an axial direction of the rotary member and generating a magnetic field over a peripheral surface of the transport member; and a supporting guide formed on the peripheral surface of the transport member, wherein the rotation of the rotary member allows parts to be transported in an axial direction of the transport member along the supporting guide, with an object of transporting being magnetically attracted to the peripheral surface of the transport member, and wherein the supporting guide is circular in cross-section.

2. The transport apparatus according to claim 1, wherein the supporting guide extends spirally from one side of the transport member to the other side of the transport member in the axial direction of the transport member.

3. The transport apparatus according to claim 1 or 2, wherein a plurality of magnet strips is arranged on the rotary member in a line along the axial direction of the rotary member.

4. A transport apparatus comprising:

a cylindrical transport member;

a cylindrical rotary member accommodated inside the transport member;

a groove formed on a peripheral surface of the rotary member in a line along an axial direction of the rotary member;

one or more magnet strips mounted on the rotary member in a line along the axial direction of the rotary member and generating a magnetic field over a peripheral surface of the transport member; and a supporting guide spirally formed on the peripheral surface of the transport member, and a rotation means for rotating the rotary member, wherein the rotation of the rotary member allows an object of transporting to be transported in an axial direction of the transport member along the supporting guide, with the object of transporting being magnetically attracted to the peripheral surface of the transport member.

5. The transport apparatus according to claim 4, further comprising a yoke strip mounted on a surface of the magnet strip or strips and concentrating magnetic lines of force emitted by the magnet strip or strips.

6. The transport apparatus according to claim 5, further comprising a transfer means extending outward from the peripheral surface of the transport member and transferring the object of transporting being transported in the axial direction of the transport member to a place at a certain distance apart from the transport member.

7. The transport apparatus according to claim 6, wherein the transport member stands vertically so that the object of transporting are transported from one side of the transport member to the other side of the transport member in the axial direction of the transport member along the supporting guide.

8. The transport apparatus according to claim 7, wherein the supporting guide includes a plurality of supporting strips.

9. A transport apparatus comprising:

a cylindrical transport member;

a guide container storing an object of transporting in the guide container temporarily and supplying the object of transporting to the transport member;

a cylindrical rotary member accommodated inside the transport member;

a magnetic force generation portion provided on the rotary member and generating a magnetic field over a peripheral surface of the transport member;

a supporting guide spirally formed on the peripheral surface of the transport member, and a prevention means for preventing the object of transporting transported from the guide container to the transport member from being bridged with each other, wherein the rotation of the rotary member allows the object of transporting supplied from the guide container to be transported in an axial direction of the transport member along the supporting guide, with the object of transporting being magnetically attracted to the peripheral surface of the transport member.

10. The transport apparatus according to claim 9, wherein the prevention means includes a transfer means for transferring the object of transporting along a progress direction of the supporting guide.

11. The transport apparatus according to claim 10, wherein the transfer means includes a stirring means for stirring the object of transporting around the transport member.

12. The transport apparatus according to claim 10, wherein the transfer means includes an shake means for shaking the object of transporting.

13. The transport apparatus according to claim 11, wherein the stirring means includes a rotation means for rotating the guide container on the transport member.

14. A transport apparatus comprising:

a cylindrical transport member;

a guide container mounted on the transport member at one side of the transport member in an axial direction of the transport member and storing an object of transporting in the guide container temporarily and supplying the object of transporting to the transport member;

a cylindrical rotary member accommodated inside the transport member;

a magnet provided on the rotary member linearly in an axial direction of the rotary member and generating a magnetic field over a peripheral surface of the transport member;

supporting guide spirally formed on the peripheral surface of the transport member; and a rotation means for rotating the guide container in the same direction as a rotation direction of the rotary member for transporting the object of transporting around the transport member along the supporting guide, wherein the rotation of the rotary member allows the object of transporting supplied from the guide container to be transported from one side of the transport member to the other side of the transport member in an axial direction of the transport member along the supporting guide, with the parts being magnetically attracted to the peripheral surface of the transport member, and wherein the supporting guide is circular in cross-section.

15. The transport apparatus according to claim 14, wherein the transport member stands vertically so that the object of transporting are transported from one side of the transport member to the other side of the transport member in the axial direction of the transport member along the supporting guide.

16. A transport apparatus comprising:

a transport means for transporting an object of transporting along a transport path extending from one side of the transport apparatus to the other side of the transport apparatus;

a transfer path for transferring the object of transporting transported along the transport path of the transport means to a place at a certain distance apart from the transport member; and a supporting means for supporting the transfer path at a predetermined position of the transport path, wherein the supporting means has a pair of sandwiching members for sandwiching the transport path and a clamping means for clamping the sandwiching members to the transport path; and a pair of the sandwiching members is mounted on the transport path such that the sandwiching members are movable in a transport direction of the transport path and rotatable in a circumferential direction of the transport path.

17. A transport apparatus comprising:

a cylindrical transport member;

a cylindrical rotary member accommodated inside the transport member;

a magnetic force generation portion formed on the rotary member and generating a magnetic field over a peripheral surface of the transport member;

a supporting guide spirally formed on the peripheral surface of the transport member;

a transfer path for transferring an object of transporting transported along the supporting guide to a place at a certain distance apart from the transport member; and a supporting means for supporting the transfer path at a predetermined position of the transport member, wherein the rotary member rotates such that the object of transporting are transported in a lead angle direction of the supporting guide, thus causing the object of transporting to be magnetically attracted to the peripheral surface of the transport member, with the result that the object of transporting are transported in an axial direction of the transport member along the supporting guide;

the supporting means has a pair of sandwiching members for sandwiching the transport member and a clamping means for clamping a pair of the sandwiching members to the transport member; and a pair of the sandwiching members is mounted on the transport member such that the sandwiching members are movable in an axial direction of the transport member and rotatable in a circumferential direction of the transport member.

18. The transport apparatus according to claim 17, wherein a groove in which the supporting guide is fitted is formed on an inner peripheral surface of a pair of the sandwiching member.

19. A transport apparatus comprising:

a cylindrical transport member;

a cylindrical rotary member accommodated inside the transport member;

a magnetic force generation portion formed on the rotary member linearly in an axial direction of the rotary member and generating a magnetic field over a peripheral surface of the transport member;

a supporting guide spirally formed on the peripheral surface of the transport member;

a transfer path for transferring an object of transporting transported along the supporting guide to a place at a certain distance apart from the transport member; and a supporting means for supporting the transfer path at a predetermined position of the transport member, wherein the rotary member rotates such that the object of transporting are transported in a lead angle direction of the supporting guide, thus causing the object of transporting to be magnetically attracted to the peripheral surface of the transport member, with the result that the object of transporting are transported in an axial direction of the transport member along the supporting guide;

the supporting means has a pair of sandwiching members for sandwiching the circumference of the transport member and a clamping means for clamping a pair of the sandwiching members to the transport member; and a pair of the sandwiching members is mounted on the transport member such that the sandwiching members is movable in an axal direction of the transport member and rotatable in a circumferential direction of the transport member; and a plurality of coil-shaped grooves fitted in the supporting guide and having a width greater than the diameter of the supporting guide and a plurality of contact portions which contact the peripheral surface of the transport member are formed on a pair of the sandwiching members.

20. The transport apparatus according to claim 16 or 17, wherein a mounting means for mounting the sandwiching members on the transfer path is provided on a pair of the sandwiching members.

21. The transport apparatus according to claim 16 or 17, further comprising a guide container which stores the object of transporting in the guide container temporarily and supplying the object of transporting to the transport member and is rotatable in the same direction as a rotation direction of the rotary member around the transport member.

22. The transport apparatus according to claim 16 or 17, wherein the transport member stands vertically so that the object of transporting are transported from one side of the transport member to the other side of the transport member in the axial direction of the transport member along the supporting guide.

23. The transport apparatus according to claim 1 or 14, further comprising a plurality of transfer paths mounted onto said cylindrical transport member, wherein each of said transfer paths includes a supporting tool and an auxiliary member for allowing said path to be mounted at desired positions along the axial direction of said transport member and in any direction in the circumferential direction of said transport member.

\* \* \* \* \*